US012597690B2

(12) United States Patent
Herbsommer et al.

(10) Patent No.: US 12,597,690 B2
(45) Date of Patent: Apr. 7, 2026

(54) QUANTUM-BASED DEVICE INCLUDING GAS CELL

(71) Applicant: Texas Instruments Incorporated, Dallas, TX (US)

(72) Inventors: Juan Herbsommer, Allen, TX (US); Hassan Ali, Murphy, TX (US); Claudia Vasanelli, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 153 days.

(21) Appl. No.: 18/385,465

(22) Filed: Oct. 31, 2023

(65) Prior Publication Data

US 2024/0313384 A1 Sep. 19, 2024

Related U.S. Application Data

(60) Provisional application No. 63/490,258, filed on Mar. 15, 2023.

(51) Int. Cl.

*H01P 3/12* (2006.01)
*H01Q 9/04* (2006.01)
*H01Q 21/06* (2006.01)

(52) U.S. Cl.

CPC ........... *H01P 3/122* (2013.01); *H01Q 9/0407* (2013.01); *H01Q 21/065* (2013.01)

(58) Field of Classification Search

CPC .... H01P 3/122; H01Q 9/0407; H01Q 21/065; H01Q 1/525; H01Q 5/371; H01Q 15/008
USPC ............... 333/24 R, 227, 230, 248, 202, 203
See application file for complete search history.

(56) References Cited

U.S. PATENT DOCUMENTS 9,819,067 B2 * 11/2017 Yang ......................... H01P 5/08
2013/0278349 A1 10/2013 Dayan
2022/0209779 A1 6/2022 Herbsommer

FOREIGN PATENT DOCUMENTS

WO 2019147376 A1 8/2019

OTHER PUBLICATIONS

International Searching Authority, Search Report for PCT/US2024/020047, mailed Jun. 27, 2024, 3 pages.
International Searching Authority, Written Opinion for PCT/US2024/020047, mailed Jun. 27, 2024, 6 pages.

* cited by examiner

*Primary Examiner* — Jorge L Salazar, Jr.
(74) *Attorney, Agent, or Firm* — Zhenhai Fu; Frank D. Cimino

(57) ABSTRACT

In one example, an apparatus includes a substrate, an antenna on the substrate, a sealed container enclosing a dipolar gas, a waveguide, and a stub. The waveguide is communicatively coupled between the antenna and the sealed container. The waveguide is separated from the substrate by a gap. The stub is adjacent to the waveguide and extends away from the gap.

20 Claims, 20 Drawing Sheets

400

QUANTUM-BASED DEVICE INCLUDING GAS CELL

RELATED APPLICATIONS

The present application claims priority to U.S. Provisional Patent Application No. 63/490,258, titled "Integration of physics cells with microelectronic substrate for quantum sensors for quantum applications," filed Mar. 15, 2023, which is hereby incorporated by reference. The present application is related to the following co-owned applications: U.S. Provisional Patent Application No. 63/419,375, titled "Quantum Sensor and Integration with Microelectronic Devices," filed on Oct. 26, 2022, and U.S. Provisional Patent Application No. 63/383,971, titled "Quantum Sensor and Integration with Microelectronic Devices," filed on Nov. 16, 2022, and U.S. Non-provisional patent application Ser. No. 18/374,724, titled "Quantum-Based Device Including Vapor Cell," which are all hereby incorporated herein by reference in their entireties.

BACKGROUND

A gas cell (or a physics cell) can include a hermetically sealed container containing a gas. Depending on the pressure and temperature inside the container, the gas can be in a gaseous state or in a vapor state. A gas cell may be useful in numerous applications, including as part of a chip-scale millimeter-wave atomic clock. The gas within a gas cell can contain dipolar molecules at a relatively low pressure that can be chosen to provide a narrow signal absorption frequency dip indicative of the quantum rotational transition of the gas molecules as detected at an output of the cavity. An electromagnetic (EM) signal can be launched into and out of the cavity through apertures in the cavity that are electromagnetically translucent or substantially transparent. Closed-loop control can dynamically adjust the frequency of the signal to match the molecular quantum rotational transition. The frequency of the quantum rotational transition of the selected dipolar molecules may vary less due to aging of the chip-scale millimeter-wave atomic clock and with temperature or other environmental factors, which makes the system useful to provide an accurate clock source that also has long-term stability. The overall performance of the system may be affected by various factors, such as leakage of the EM signal as it propagates into and out of the cavity.

SUMMARY

In one example, an apparatus includes a gas cell. That gas cell includes a gas cell cavity, an opening, and a trench. The opening extends between the gas cell cavity and an external surface of the gas cell enclosure. A first internal surface of the opening is coated with a first electromagnetic (EM) reflective coating. The trench is on a periphery of the opening and extends from the external surface. A second internal surface of the trench is coated with a second EM reflective coating.

In another example, an apparatus includes a substrate, an antenna on the substrate, a sealed container enclosing a dipolar gas, a waveguide, and a stub. The waveguide is communicatively coupled between the antenna and the sealed container. The waveguide is separated from the substrate by a gap. The stub is adjacent to the waveguide and extends away from the gap.

BRIEF DESCRIPTION OF THE DRAWINGS

The same reference numbers or other reference designators are used in the drawings to designate the same or similar (functionally and/or structurally) features. The figures are not necessarily drawn to scale.

DETAILED DESCRIPTION

Figure 1:
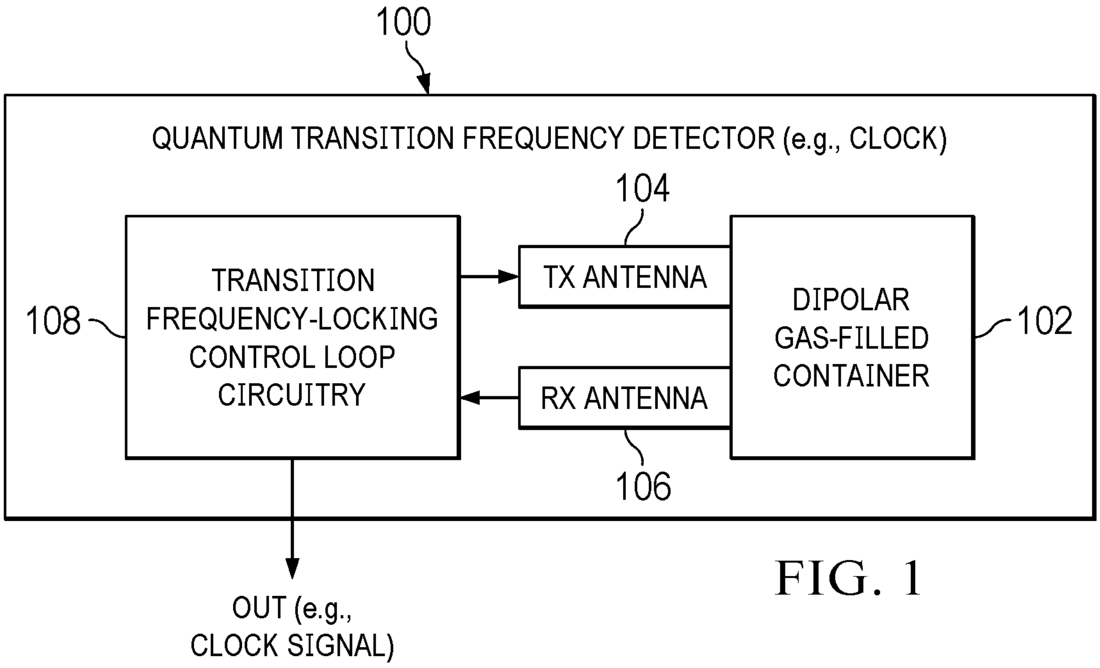
FIG. 1 is a schematic illustrating an example quantum transition frequency detector.

FIG. 1 is a block diagram of an example quantum transition frequency detector 100 that can be integrated to provide, for example, a clock that is accurate to within one second in several hundred years. In other examples, the frequency detector 100 is useful to create a magnetic field sensor (magnetometer), an electric field sensor, or a pressure sensor. Detector 100 includes a container 102, or an assembly that includes multiple such containers. The container 102 is (or part of) a gas cell that is hermetically sealed to contain a dipolar gas at a relatively low pressure, the precise pressure depending on which dipolar gas is used, among other factors. In some examples, the pressure is less than the atmospheric pressure at sea level. In some examples, the pressure is less than one one-hundredth of atmospheric pressure at sea level. In some examples, the pressure is less than one one-thousandth of atmospheric pressure at sea level. In some examples, the pressure is less than one ten-thousandth of atmospheric pressure at sea level. Suitable dipolar gases can include water vapor (H2O), acetonitrile (CH3CN), cyanoacetylene (HC3N), ammonia (NH3), carbonyl sulfide (OCS), hydrogen cyanide (HCN), and hydrogen sulfide (H2S). In some examples, container 102 may be a glass (e.g., borosilicate) tube, as described further with reference to FIG. 2.

The container 102 (or each container in an assembly) can be coated on the outside with an electromagnetically reflective (e.g., electrically conductive) material (e.g., a metal), or the container 102 (or each container in an assembly) can be placed in an enclosure (e.g., enclosure 504 of FIG. 5) that is made of or coated with an electromagnetically reflective material such that exterior walls of the container adjoin (e.g., are substantially in contact with) the electromagnetically reflective material of the enclosure. As examples, the enclosure can be metal or metal-coated plastic. As examples, metallization of the container 102 or the enclosure can be done by sputtering or by evaporation. A single container, or multiple containers assembled in an enclosure, can form a gas cell. Transmitter (TX) and receiver (RX) antennas (104, 106) are coupled to the container 102 at electromagnetically translucent or substantially transparent windows or container-end access points to respectively launch into the container(s) 102 and receive from the container(s) 102 millimeter-wave electromagnetic radiation that courses through the container(s) 102.

Circuitry 108 coupled to the antennas (104, 106) provides a closed loop that can sweep the frequency of millimeter-wavelength electromagnetic waves (e.g., between about 20 GHz and about 400 GHz, e.g., between about 70 GHz and about 180 GHz) radiated to the dipolar gas molecules confined in the containers 102. An absorption at the particular frequency of a quantum transition of the dipolar gas molecules can be observed as a decrease in the power transmitted between transmitter and receiver, and specifically, as a dip in transmitted power at a particular frequency (or a set of frequencies) within the swept frequency range. Iteratively locking to the bottom of the dip provides the quantum transition frequency of the molecules of the confined gas, of which the transition frequency can be relatively stable with respect to the age of the hermetic container, the temperature, and other environmental factors. The stability permits detector 100 to be used for creating accurate quantum references and clocks, the accuracy of which is not substantially reduced with device age or changes in operating environment. Circuitry 108 can include, for example, a voltage-controlled oscillator (VCO) or a digital controlled oscillator (DCO) to generate millimeter waves at a particular frequency that is adjusted until the frequency matches the reference peak absorption frequency (the frequency location of the transmitted power dip).

Linear dipolar molecules have rotational quantum absorption at regular frequencies. As an example, OCS exhibits a transition approximately every 12.16 GHz. A gas cell as described herein thus can make use of any of the many available quantum transitions in the millimeter-wave frequency range. Circuitry 108 can further include, for example, a divider to divide down the matched frequency, which can be in the tens or hundreds of gigahertz, to a lower output clock frequency, e.g., about 100 MHz. The use of millimeter waves can eliminate (or reduce) the need for a laser as a quantum transition interrogation mechanism, reducing cost and complexity of detector 100 over devices requiring lasers. Operation within the aforementioned frequency ranges permits the transmitter and receiver antennas (104, 106) to be of lengths less than, for example, 10 millimeters, 5 millimeters, or 1 millimeter, depending on the quantum transition frequency of the dipolar gas selected. The container 102 (or each container used in an assembly of containers) can each measure between, for example, about 1 centimeter and about 20 centimeters in length, or about 2 centimeters and about 10 centimeters in length. The container 102 (or each container used in an assembly of containers) can each measure less than about 1 centimeter in dimensions of width and height. In a case where the container 102 is shaped as a circular, elliptical, or rectangular cross-section tube, it can also have a diameter of less than about 1 centimeter. Because quantum absorption increases with container length, with longer container lengths providing for a better-defined observed quantum transition, the length of the container 102 can be limited by fabrication limitations and system package size limitations. Meandering or serpentine-shaped gas cells can provide longer effective container length within a more compact system package size either by using a bent (e.g., U-shaped) container or by coupling together multiple containers.

Figure 2:
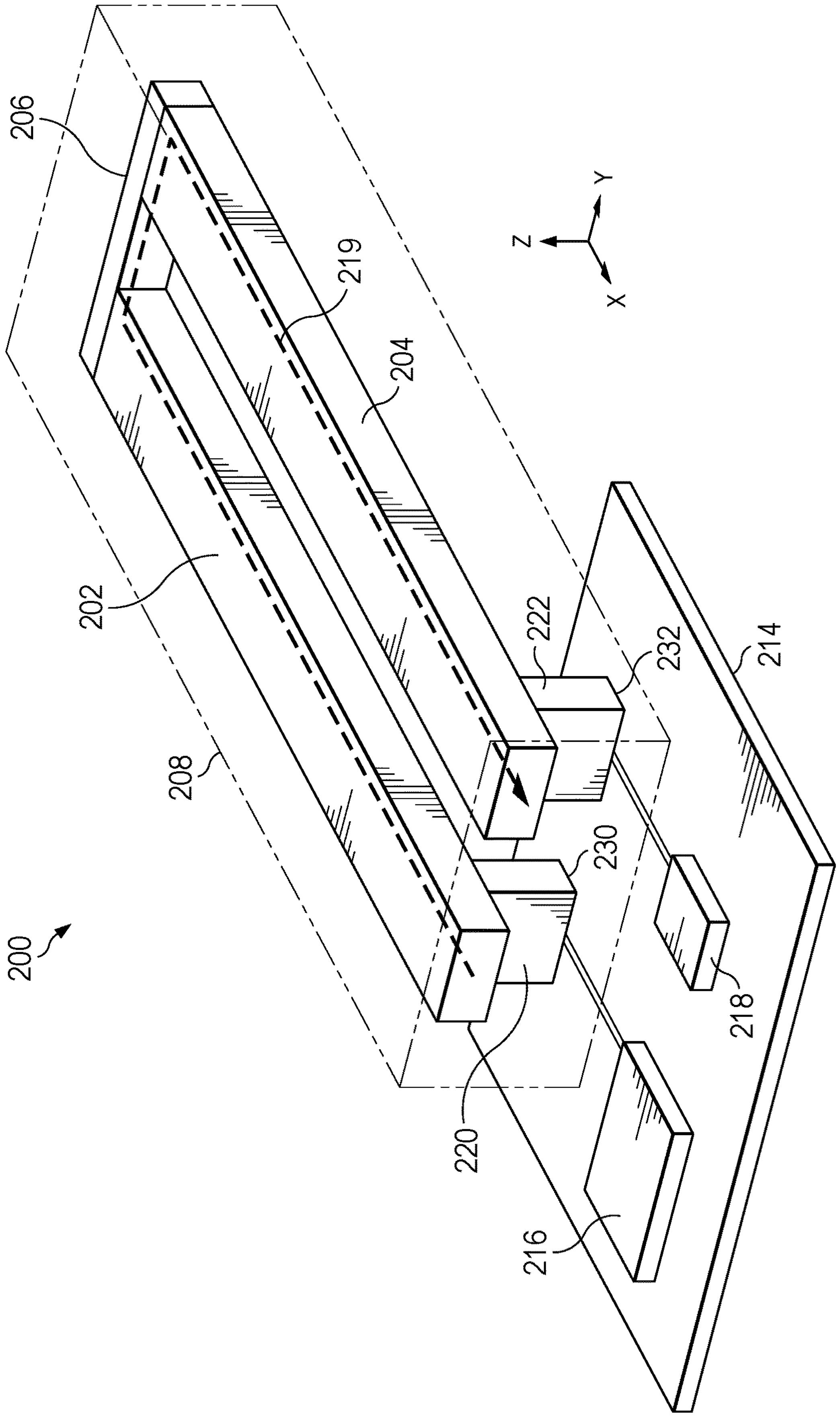
FIG. 2 is a schematic illustrating example components of the quantum transition frequency detector of FIG. 1.

FIG. 2 illustrates a quantum transition frequency detector 200, which can be an example of the quantum transition frequency detector 200. Detector 200 includes a gas-confining container, which can include container portions 202 and 204 each containing a dipolar gas. In some examples, the container can also include a device 206. In examples, device 206 can be another contain portion containing the dipolar gas. Each of container portions 202, 204, and device 206 can include a cavity. In some examples, the cavities can join and form an extended U-shaped cavity. In some examples, each of container portions 202 and 204, and device 206 (if it contains a cavity) are sealed and the cavities are physically sealed from each other. In some examples, device 206 does not contain a dipolar gas, or can be a solid and configured as a waveguide communicatively coupled between container portions 202 and 204. An EM signal can propagate from transmit circuitry 516 through container portion 202, device 206, container portion 204, and reach receive circuitry 218, as indicated by dotted line 219.

Gas container portions 202 and 204 and device 206 are enclosed within a container enclosure 208. Container enclosure 208 is mechanically coupled to a substrate, such as a printed circuit board (PCB), or a package substrate 214 of an integrated circuit having circuitry disposed thereon, including transmit circuitry 216 and receive circuitry 518.

Container enclosure 208 also has cavities forming (or accommodating) multiple signal couplers 220, 222. Signal coupler 220 is coupled between container portion 202 and a first antenna (e.g., TX antenna 104, not shown in FIG. 2), and signal coupler 222 is coupled between container portion 204 and a second antenna (e.g., RX antenna 106, not shown in FIG. 2). Signal couplers 220 and 220 each is configured as a waveguide and can support vertical launch, where EM signal travel vertically (e.g., along the z-axis) between the first antenna and container portion 202 and between the second antenna and container portion 204. In some examples, signal couplers 220, 222 are each a hollow cavity interiorly coated with an electromagnetically reflective material (e.g., metallized), and with electromagnetically translucent or substantially transparent window regions located at the top and bottom thereof. In some examples, signal couplers 220, 222 may each incorporate solid dielectric material (e.g., plastic) that is enclosed within electromagnetically reflective material (e.g., metallized), with electromagnetically translucent or substantially transparent window regions located at the top and bottom thereof. In some examples, signal couplers 220 and 222 can also have same material and solid/hollow configuration as device 206.

Regardless of whether a hollow or solid configuration is used, including a combination thereof, signal couplers 220, 222 can operate as waveguides by guiding the propagation of EM signals therethrough. The first and second antennas (not shown in FIG. 2) are communicatively coupled to signal couplers 220, 222 through respective interfaces 230 and 232 of container enclosure 208.

Figure 3:
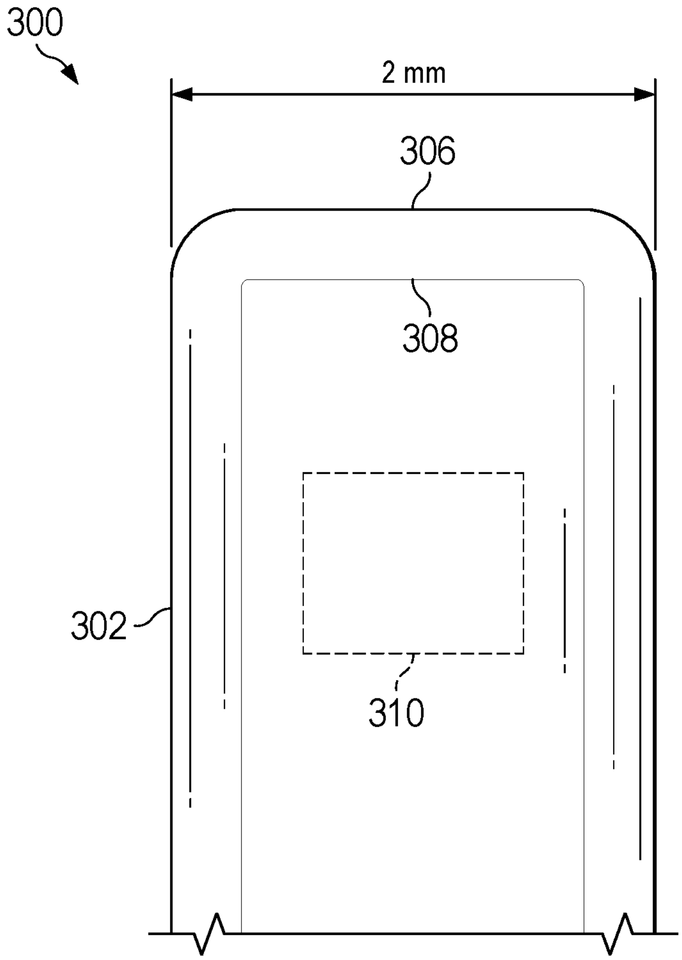
FIG. 3 is a cross-sectional top-down view of one end of an example vial that can be part of the example detector of FIG. 1.

FIG. 3 illustrates a view 300 of one end of container portion 202 (or 204). In this example, container portion 202 can be in the form of a vial. The illustrated end of container portion 204 is blunt or flat and has an outer surface 306 and an inner surface 308. In the example shown in FIG. 3, the outer surface 306 and the inner surface 308 are flat. In some other examples, the outer surface 306 may be concave, and the inner surface 308 may be convex. The illustrated end of container portion 202 also has or is proximate to a window region 310, which representatively shows an electromagnetically translucent or substantially transparent access point that may be used to respectively launch into the container portion 202 or receive from the container portion 202. As described further herein with reference to FIGS. 1 and 2, in some examples, the window region 310 may correspond to an opening within an exterior metallic coating applied directly on the vial 302. In some examples, the window region 310 may correspond to an opening within an electromagnetically reflective material (e.g., metallized) coating applied to the inner surfaces of an enclosure into which container portion 202 is placed, such that when container portion 202 is seated in the enclosure, metal adjoins (e.g., is substantially in contact with) the outside of the glass walls of the container portion 202 and window region 310 is proximate to the illustrate end of vial 302.

Figure 4:
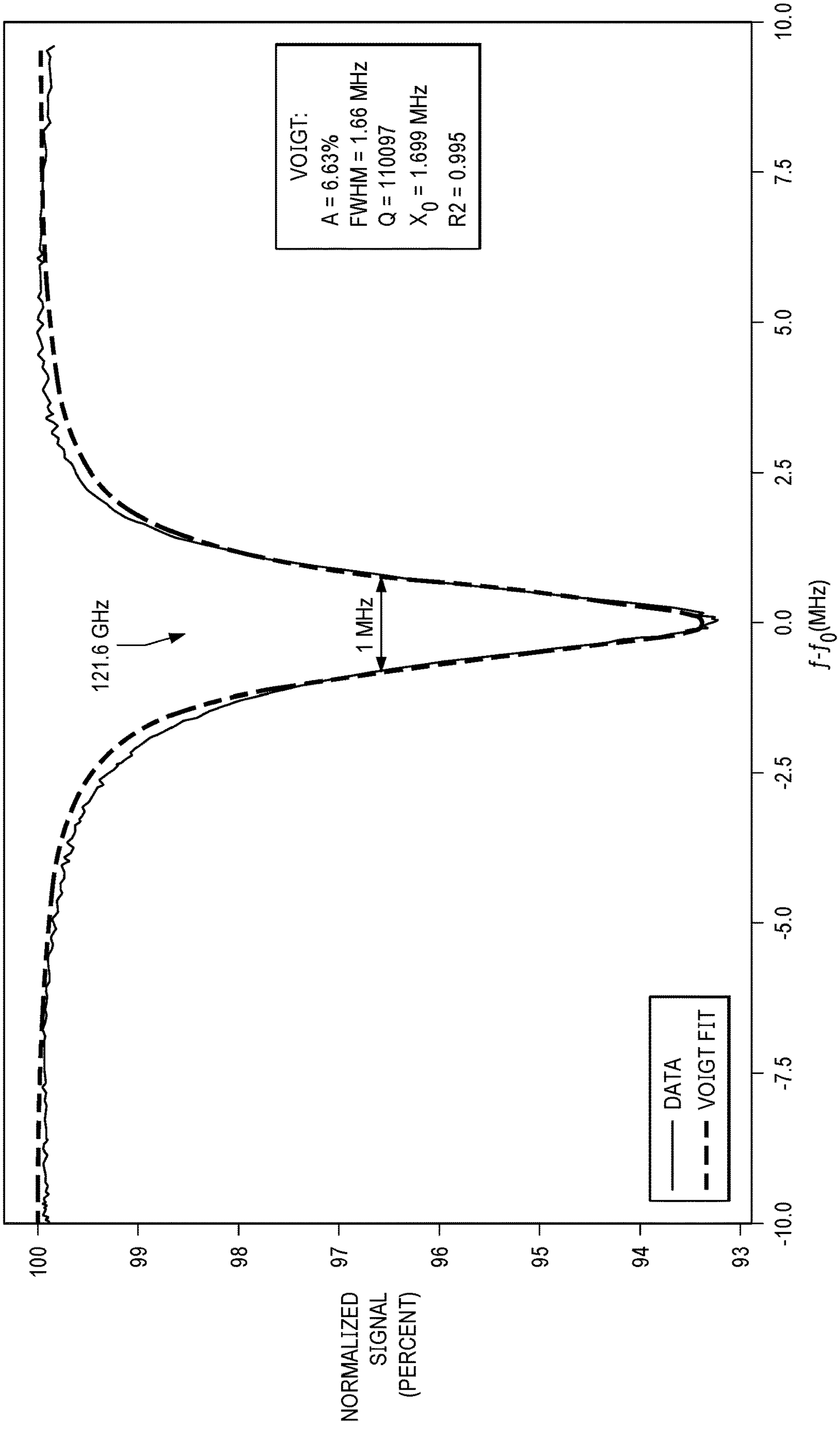
FIG. 4 is a graph that illustrates example degrees of absorption of an EM signal by a dipolar gas at different EM signal frequencies.

FIG. 4 is a graph 400 that illustrates example degrees of absorption of an EM signal by the dipolar gas in gas cell, such as container 102, with respect to the EM signal frequency. The degrees of absorption are reflected by, for example, the ratio of the power received at RX antenna 106 over the power outputted at TX antenna 104 (i.e., P-out/P-in), as a function of transmitted frequency, in the example quantum transition frequency detector of FIG. 1.

As described above with reference to FIG. 1, a millimeter-wavelength EM signal is transmitted by TX antenna 104 into dipolar gas-filled container 102, and the EM signal propagates through container 102 and reaches RX antenna 106. As the frequency of the EM signal is swept, at the particular frequency of a quantum transition of the dipolar gas molecules can be observed as a decrease in the power transmitted between transmitter and receiver, and specifically, as a dip in transmitted power at a particular frequency (or a set of frequencies) within the swept frequency range. Referring to graph 400, a dip in transmitted power from 100% to 94% can be observed at 121.6 GHz, which can be the quantum transition frequency. The bandwidth of the dip is about 1 MHz.

Figure 5:
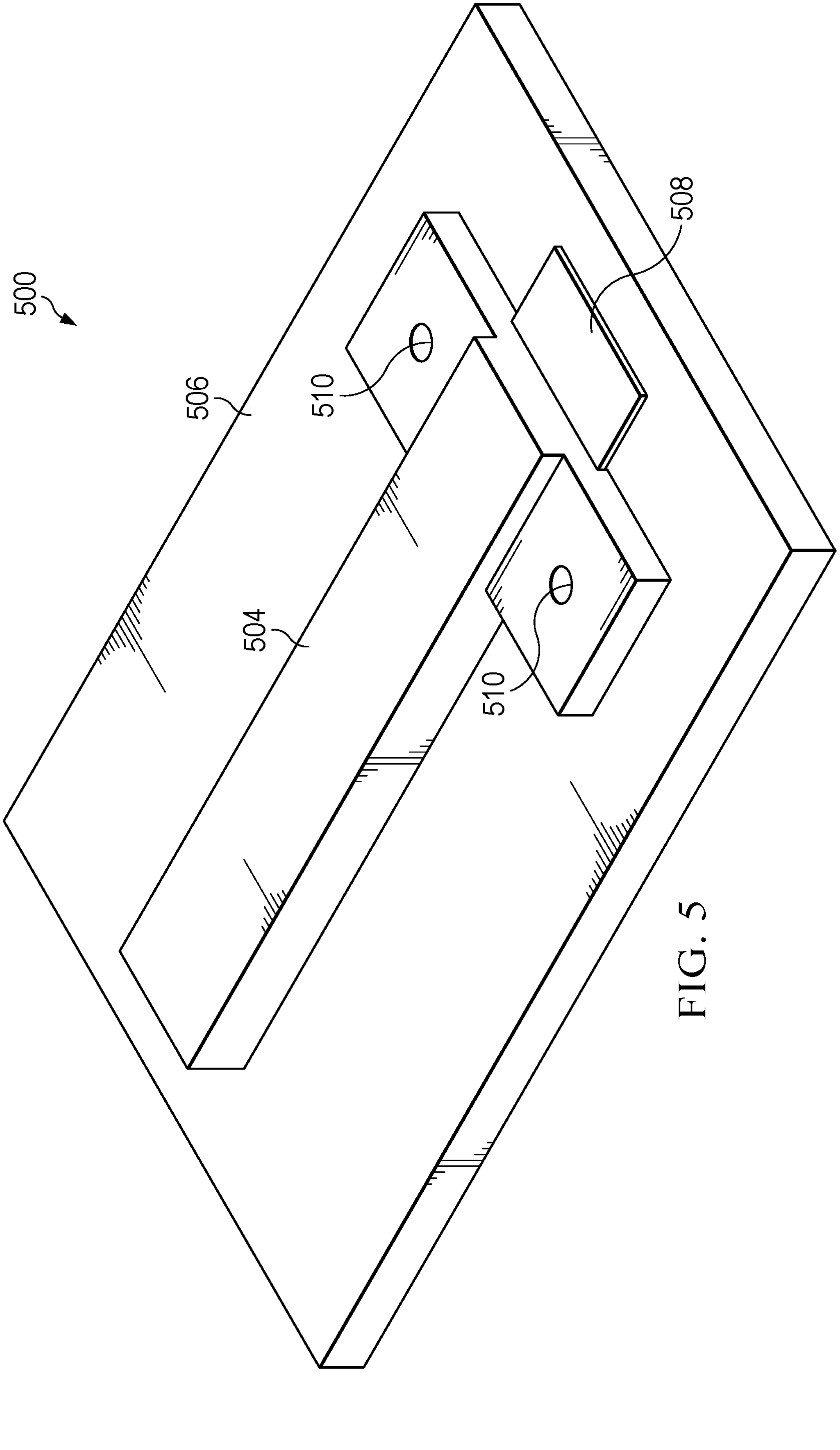
FIG. 5 is a schematic illustrating a perspective and external view of the example quantum frequency detector system of FIG. 1.

FIG. 5 is a perspective view of an example quantum frequency detector system 500, which can be an example of detector 100 and 200 of FIGS. 1 and 2. In this example, detector system 500 includes a gas cell enclosure 504 that can be mounted to a larger substrate 506 belonging to a larger system. The enclosure 504 can be mounted to the substrate 506 by pin or screw (or other securing device) 510, or can be adhered thereon. The substrate 506 can, for example, measure about 5 mm by 5 mm in length and width (which dimensions are shown in the top-down view of FIG. 8). Circuitry 508 can include a variety of integrated circuit components, such as antennas 104, 106 of FIG. 1, for example. As shown more clearly in FIG. 8, portions of circuitry 508, which can be a packaged integrated circuit, may be formed on or within a package substrate coupled to substrate 506, such that at least a portion of circuitry 508 is positioned between substrate 506 and enclosure 504.

Figure 6:
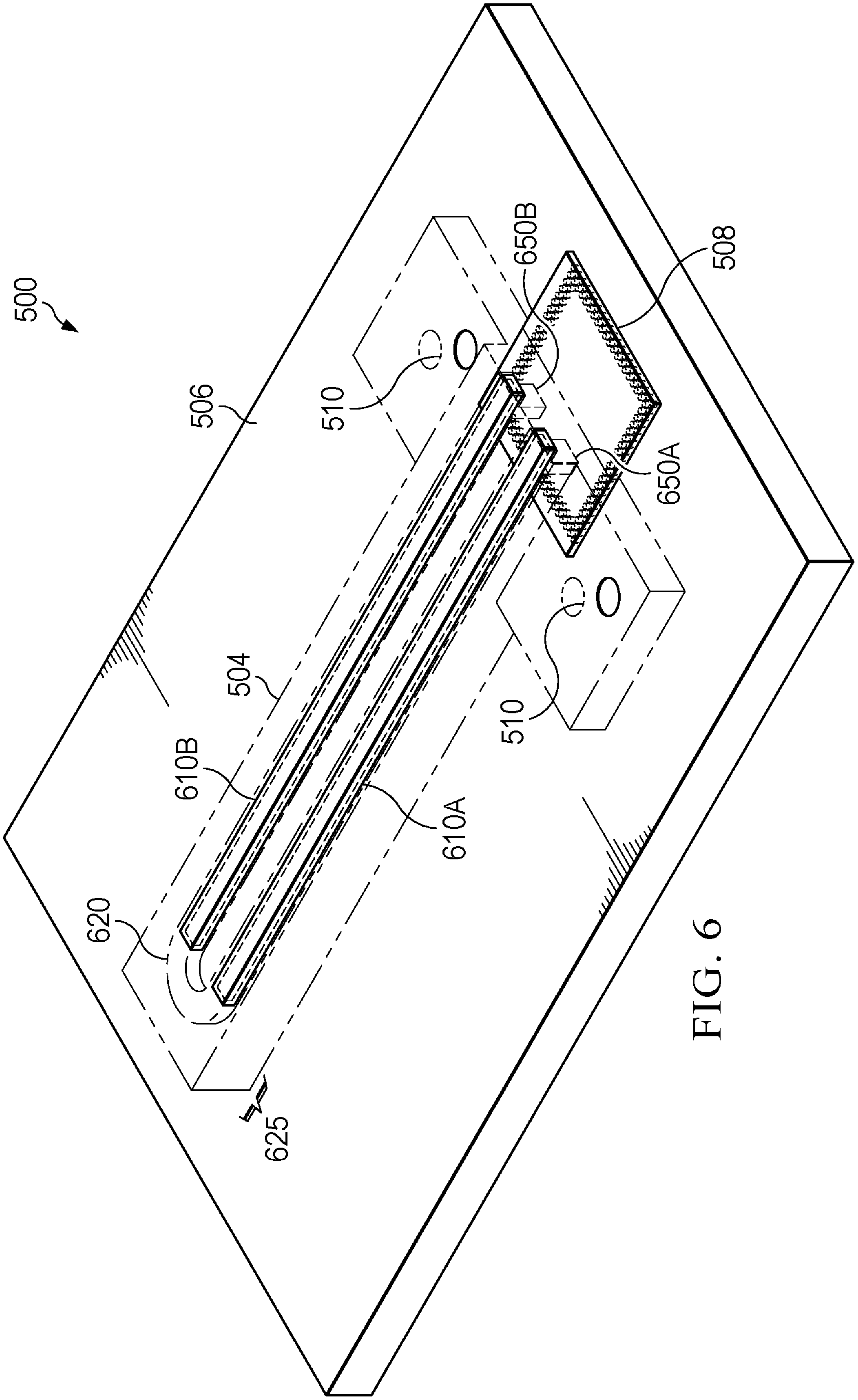
FIG. 6 is a schematic illustrating a perspective and internal view of the detector system of FIG. 5.

FIG. 6 is a perspective and transparent view of detector system 500 of FIG. 5, in which the gas cell enclosure 504 is shown as transparent to illustrate certain interior gas cell features thereof, including containers 610A, 610B enclosed within an internal gas cell cavity 620 and signal couplers/waveguides 650A, 650B. In this example, containers 610A, 610B are parallel to one another, are arranged within enclosure 504 along the same plane, and are aligned parallel to the y-axis at respective positions within cavity 620. Containers 610A, 610B may each be a dipolar gas-confining container 102, as described with reference to FIG. 1. Waveguides 650A, 650B are examples of signal couplers 220 and 222 of FIG. 2.

Each container 610A, 610B can be coated on the outside with an electromagnetically reflective (e.g., electrically conductive) material (e.g., a metal), or the cavity 620 within enclosure 504 can be made of or coated with an electromagnetically reflective material such that electromagnetically reflective material surrounds each container 610A, 610B within enclosure 504. As examples, metallization of cavity 620 can be done by sputtering or by evaporation. Cavity 620 can include an interconnecting portion 625 between containers 610A, 610B that can operate as a waveguide by guiding an EM signal from container 610A to 610B, or vice versa. In this example, containers 610A, 610B and cavity 620 collectively form at least part of a gas cell.

As shown more clearly in FIGS. 7 through 9 and 12 through 14, each waveguide 650A, 650B can include an opening extending between the gas cell cavity 620 and an external surface of the gas cell enclosure 504 interfacing PCB 506. The opening can be hollow/void (e.g., filled with air), or can be filled with a solid dielectric material, as described above. Each Waveguides 650A, 650B can be aligned parallel to the z-axis and can each be between a respective container 610A, 610B and circuitry 508. The internal surfaces of each waveguide 650A, 650B are made of or are coated with an electromagnetically reflective surface and is capable of guiding an EM signal by restricting its transmission (e.g., in a direction parallel to the z-axis). For example, waveguide 650A can direct an EM signal from a TX antenna 104 (e.g., included within or coupled to circuitry 508) to container 610A and waveguide 650B can direct the EM signal from container 610B to an RX antenna 106 (e.g., included within or coupled to circuitry 508). In this context, waveguide 650A may be considered communicatively coupled with TX antenna 104 and container 610A and waveguide 650B may be considered communicatively coupled with container 610B and RX antenna 106. In some examples, each waveguide 650A, 650B is a hollow pipe having an interior surface coated with electromagnetically reflective material. In some examples, each waveguide 650A, 650B is a solid dielectric pipe surrounded along its length by electromagnetically reflective material, as described above.

Figure 7:
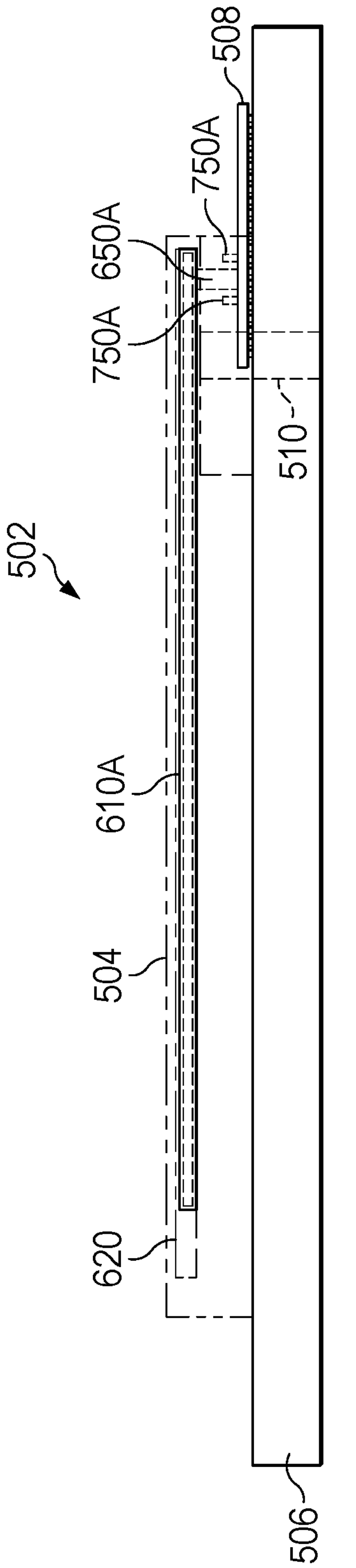
FIG. 7 is a schematic illustrating a side view of an example interface between an antenna and a waveguide structure of the detector system of FIG. 5.

FIG. 7 is a side view of a portion of detector system 502, in which is shown certain features 504, 506, 508, 510 thereof. FIG. 7 shows that waveguide 650A is between cavity 620 and circuitry 508, is aligned parallel to the z-axis, and is positioned proximate an end of container 610A, which is enclosed within cavity 620 of enclosure 504.

To improve the accuracy of the quantum transition frequency determination, it may be advantageous to have the EM signal transmitted from circuitry 508 (e.g., via antenna 104) to containers 610A, 610B to be as powerful as possible. A higher power can increase the absorption of the EM signal (and the dip shown in FIG. 4) by the dipolar gas confined within containers 610A, 610B. Such arrangements can increase the signal-to-noise (SNR) ratio by reducing the likelihood of noise that can cause a false dip detection—i.e., one that was not in fact caused by absorption of the EM signal. It is also advantageous to reduce potential interference/coupling between the transmit signal (e.g., at waveguide 650A) and the receive signal (e.g., at waveguide 650B).

The interface between certain features of circuitry 508 arranged on substrate 506 (e.g., antennas 104, 106 of FIG. 1 or antennas 1220, 1222 of FIG. 12) and the waveguides 650A, 650B of enclosure 504 can significantly affect the power of an EM signal that is transmitted to container 610A and that is received from container 610B. For example, an increase in air gap at the interface between opposing surfaces of substrate 506 (including circuitry 508) and enclosure 504 (including the openings and edges of waveguides 650A, 650B) may contribute to signal leakage as the transmit signal propagates from TX antenna 104 to waveguide 650A, and as the receive signal propagates from waveguide 650B to RX antenna 106. The signal leakage can contribute to a loss in power.

Moreover, stray transmissions of an EM signal within substrate 506, enclosure 504, or the air gap therebetween can also contribute to loss in power. An example type of stray transmission is referred to herein as "cross-talk," in which a portion of an EM signal travels directly from a transmitter (e.g., TX 104 of FIG. 1 or TX antenna 1220 of FIG. 12) to a receiver (e.g., RX antenna 106 of FIG. 1 or RX antenna 1222 of FIG. 12), as opposed to traveling from the transmitter through a gas cell to the receiver.

As described further herein with reference to subsequent figures, a quantum transition frequency detector can include leakage signal reduction structures proximate the interface between waveguides 650A/650B and the respective antennas to reduce signal leakage at the interface. The leakage signal reduction structures can include, for example, one or more trenches adjacent to and/or surrounding the waveguides. The trenches are configured as quarter-wavelength stubs and are positioned away from the waveguides. Leakage signal that propagates away from the waveguides into the air gap can propagate into the trenches and become incident leakage signal. The incident leakage signal can be reflected at the interior surface of the trench. The depth of the trench can be configured to introduce a 180-degree phase shift in the reflected leakage signal, such that the reflected leakage signal can destructive interfere with the incident leakage signal. The position of the trench can be arranged so that the reflected leakage signal, when propagating back into the waveguide, can also constructively interfere with the signal in the waveguide to further improve the power of the signal transmitted in and out of the waveguide.

Also, the package substrate of circuitry 508 can include electronic bandgap structures, and portions of the package substrate between adjacent electronic bandgap structures can also operate as quarter-wavelength stubs to generate out-of-phase reflected leakage signal and to reduce the leakage signal through destructive interference. Due to the destructive interference, the power of the leakage signal in the air gap can be significantly reduced, which can impede cross-talk and increase the power transmitted via waveguide 650A to container 610A and increase the power received from container 610B via waveguide 650B.

Figure 8:
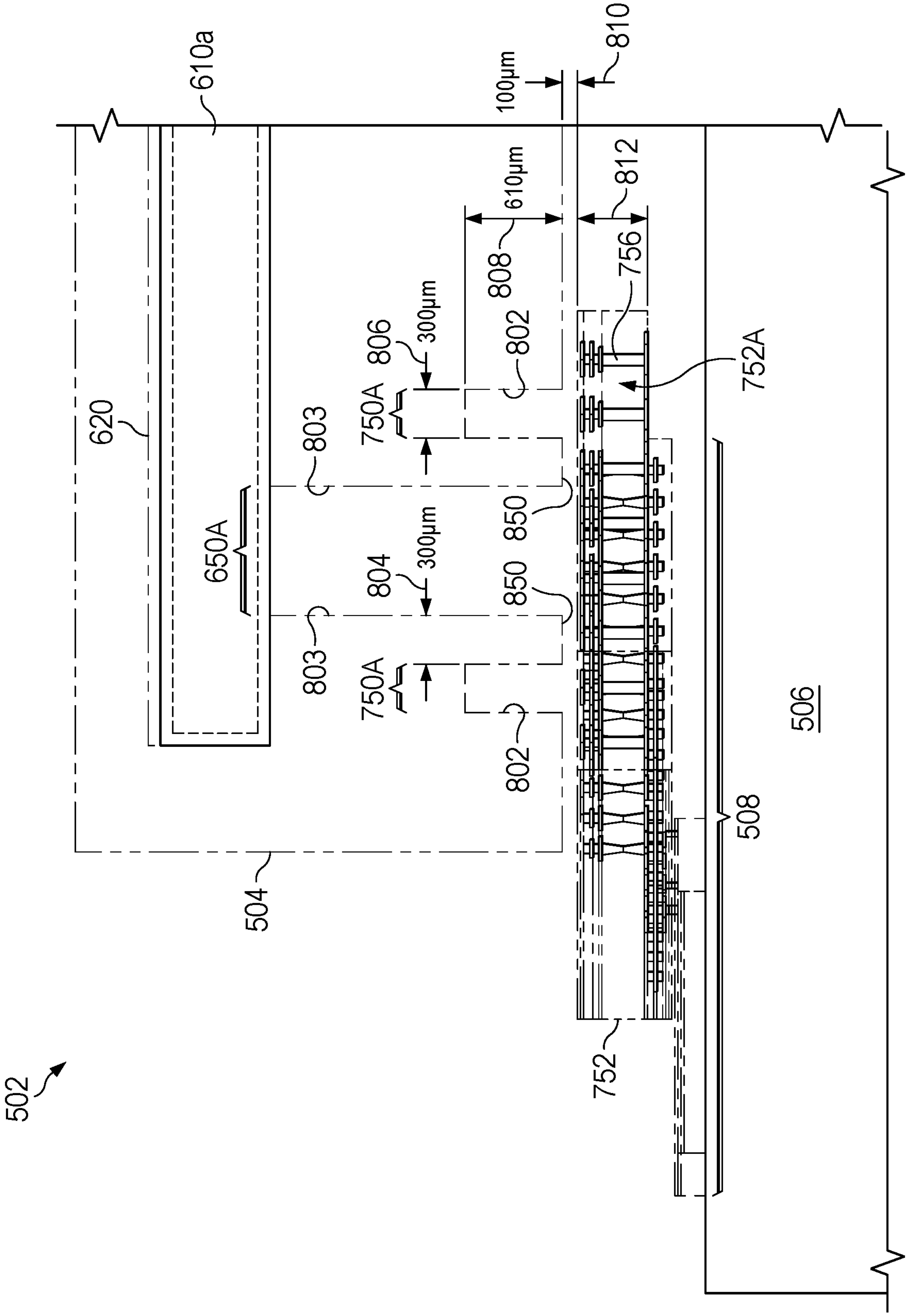
FIG. 8 is a schematic illustrating a side view of the interface of FIG. 7 including example signal leakage reduction structures.

FIG. 8 is a simplified sectional view of a portion of detector system 502 including leakage signal reduction structures. The sectional view is representative of a cross section taken parallel to the x-axis through enclosure 504, container 610A, cavity 620, waveguide 650A, trench 750A (which wraps around waveguide 650A), and a portion of circuitry 508 including package substrate 752 including electronic bandgap (EBG) structures 754 on substrate 506. Each EBG can include metallic vias through package substrate 752. The illustrated portion of circuitry 508 on substrate 506 faces the opening of waveguide 650A (at the outer edge of enclosure 504) and also faces an external opposing surface 850 of enclosure 504 surrounding the opening of waveguide 650A. In FIG. 8, trench 750A is shown as part of enclosure 504. In some other examples, trench 750A can be external to enclosure 504. For example, trench 750A can be part of a standalone waveguide structure interfacing between container 610A (which can be enclosed in enclosure 504) and circuitry 508. In some examples, the package substrate of circuitry 508 can be part of a launch-on-package, and the antennas of circuitry 508 can be E-patch antennas.

FIG. 8 shows a representation of electromagnetically reflective material 802 and 803 on at least the inner surfaces of waveguide 650A and trench 750A, respectively. In some examples where enclosure 504 is made primarily of a nonmetallic (e.g., a plastic), electromagnetically reflective material 802 and 803 can be a metal coating applied to those surface (e.g., by sputtering or by evaporation) or to all exposed outer surfaces of enclosure 504 (e.g., including those surfaces indicated by surfaces 802 and 803). In some examples where enclosure 504 is made primarily of metallic material, electromagnetically reflective material 802 and 803 can simply represent an external metallic surface of enclosure 504.

FIG. 8 also shows example dimensions 804, 806, 808, 810, 812 that can be used in accordance with one example. In this example, dimension 804 indicates a trench wall thickness of approximately 300 μm along a line parallel to the y-axis and extending between an inner surface of trench 750A and an inner surface of waveguide 650A. Dimension 806 indicates a trench width of approximately 300 μm between opposing inner surfaces of trench 750A along a line parallel to the y-axis. Dimension 808 indicates a trench depth of approximately 610 μm along a line parallel to the z-axis and extending from a trench opening at an external surface of trench 750A. The trench depth can be an odd multiple of the quarter wavelength of the EM signal in the trench. Also dimension 810 shows an air gap at the interface between opposing surfaces of enclosure 504 and circuitry 508 to be approximately 100 μm (e.g., between antennas 1220, 1222 of FIG. 12 and the respective openings of waveguides 650A, 650B). Dimension 812 indicates the thickness of a substrate included within circuitry 508 and that has electromagnetic band gap structures (EBG), as described further herein with reference to FIGS. 12, 13, and 15. The substrate thickness dimension 812 may also be configured as an odd multiple of a quarter wavelength of an EM signal in the substrate, which may cause certain impedance effects on the EM signal in the substrate, as described further herein with reference to FIG. 12. While FIG. 8 provides certain example dimensions, any suitable dimensions may be used. Waveguide 650B and trench 750B may be arranged similar to what is shown in FIG. 8 for waveguide 650A and trench 750A.

The amount of air gap (shown as dimension 810) at the interface between opposing surfaces of enclosure 504 and circuitry 508 can vary and can be caused by any of a number of factors, such as mechanical tolerances. The presence of a significant air gap at that same interface can lead to losses in energy transfer and could produce unwanted cross-talk problems between adjacent TX and RX antennas (e.g., between antennas 104, 106 of FIG. 1 or between antennas 1220, 1222 of FIG. 12). Trenches 750A, 750B may be configured to minimize the negative effects of a variable air gap at the interface between opposing surfaces of enclosure 504 and circuitry 508 (shown as dimension 810). In some examples, trenches 750A, 750B may be used in combination with EBGs, as described further herein with reference to EBGs 1210A, 1210B of FIG. 12.

Specifically, each of trenches 750A, 750B, and portions of the package substrate 752 between adjacent EBGs (e.g., package substrate portion 752A) is configured as a quarter wavelength stub. A leakage signal that propagates into the trench/package substrate as an incident signal can be reflected and propagate back into the air gap. The trench/package substrate can introduce a 180-degree phase shift between the incident signal and the reflected signal at the air gap directly below or above the trench 750A/750B or package substrate portion 752A, which creates destructive interference and prevents the leakage signal from propagating outward away from the waveguide through the air gap, or at least reduce the power of such leakage signal. Also, the trenches are positioned away from waveguide such that when the reflected signal propagates back into the waveguide, the phase shift between the reflected signal and the signal in the waveguide is a multiple of 360 degrees, and the reflected signal can constructively interfere with the signal in the waveguide to boost up the power of the signal in the waveguide. Such arrangements can improve the power of the signal transmitted in and out of the waveguide.

Figure 9:
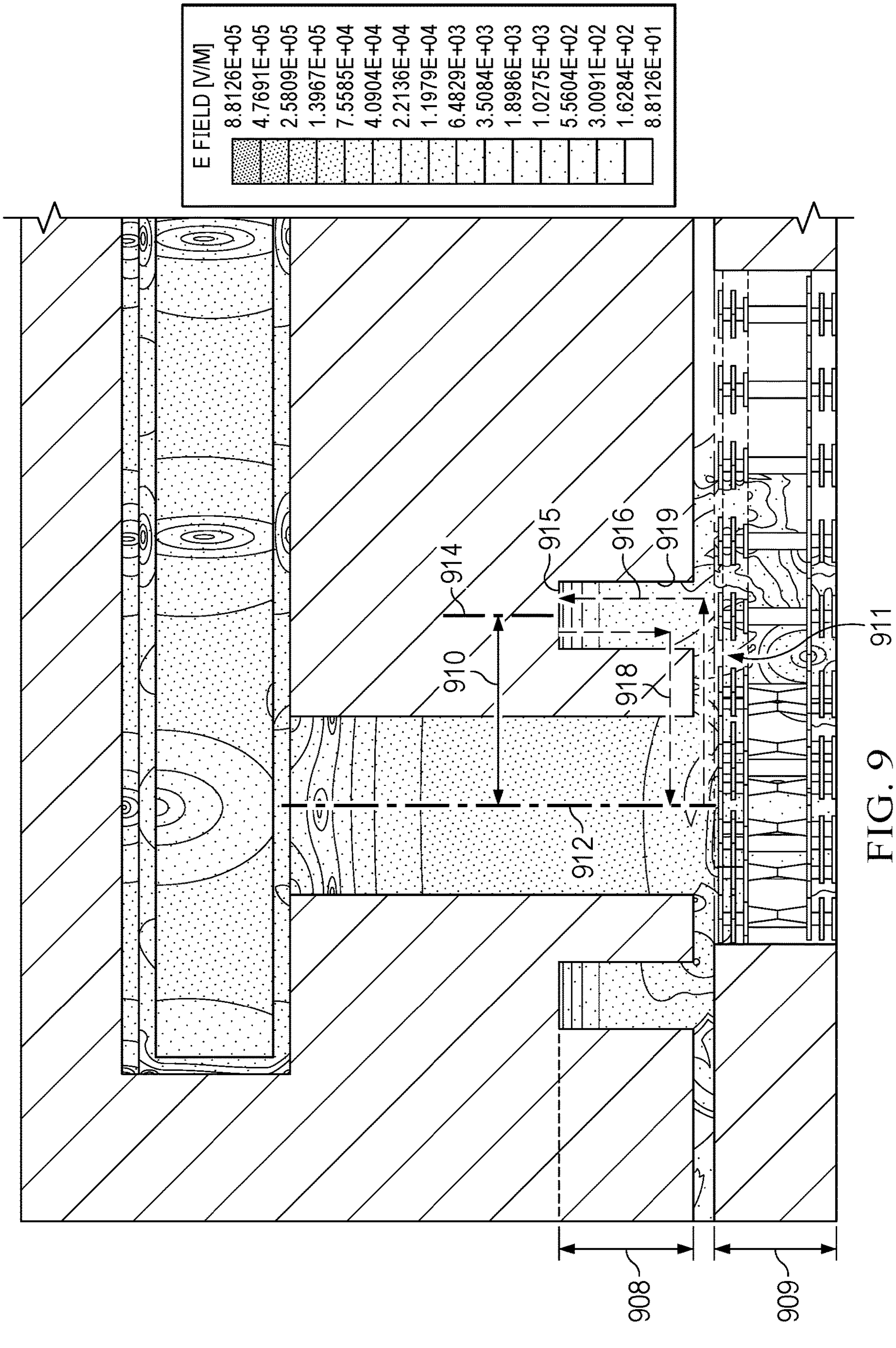
FIG. 9 is a schematic illustrating example operations of the signal leakage reduction structure of FIG. 8.

FIG. 9 shows example leakage signal reduction achieved, at least in part, by trenches 750A, 750B and package substrate 752 including EBGs. In some examples, to optimize the constructive interference and destructive interference caused by trenches 750A, 750B, 750B, each trench 760A, 750B can have a depth 908 that is an odd multiple of $\lambda 1/4$, where $\lambda 1$ represents the wavelength of the EM signal as transmitted through the trench. The package substrate 752 can also have a thickness 909 that is an odd multiple of $\lambda 2/4$, where $\lambda 2$ represents the wavelength of the EM signal as transmitted through the package substrate. The depth 908 can be defined as the distance between a base surface 915 of a trench 750A, 750N and an opposing opening 919 of the trench 750A, 750B at an edge of enclosure 504. Dimension 910 indicates the distance between a center axis 912 of one of the waveguides 650A, 650B and a center axis 914 of the corresponding trench 750A, 750B. Dimension 910 may likewise be an odd multiple of $\lambda/4$. The width of trenches 750A, 750B (dimension 806 of FIG. 8) may be $\lambda/8$. Trenches 750A and 750B may be substantially similar to one another in material respect.

As shown in FIG. 9, a portion of the EM signal traveling through air (in the air gap between enclosure 504 and substrate 506) along path 918 will enter through opening 919 towards base surface 915. If dimensions 908 and 910 are both is $\lambda/4$, then the distance the EM signal travels to arrive at base surface 915 may be represented as is $2*\lambda 4=\lambda/2$. The return path back toward the center axis 912 of waveguide 650A may likewise be represented as $2*\lambda/4=\lambda/2$. Thus, the EM signal reflected along path 916 at opening 919 of trench 750A becomes in phase (i.e., $2*\lambda/2$) with incident EM signal arriving at the same base of trench 750A along path 918. This results in constructive interference of the EM signal, which may contribute to maximizing the power of an EM signal transmitted through waveguide 650A to container 610A. Such an arrangement for trench 750A also results in creating a high impedance point that reduces the transmission of the EM signal beyond trench 750A (e.g., beyond base 915 along the z-axis and beyond the sidewalls of trench 750B). On the other hand, the phase difference between the incident EM signal and the reflected EM signal at opening 919 can be $2*\lambda/4=\lambda/2$, so that they are out-of-phase and can destructively interfere with each other. Likewise, the EM signal can propagate from location 911 of the air gap into the package substrate, guided by the EBGs, can be reflected at the bottom surface of the package substrate, and the reflected EM signal and the incident signal at location 911 can also be out-of-phase and can destructively interfere with each other. Accordingly, the leakage signal propagating outwards away from the trenches and the waveguide can be attenuated or eliminated.

Figure 10:
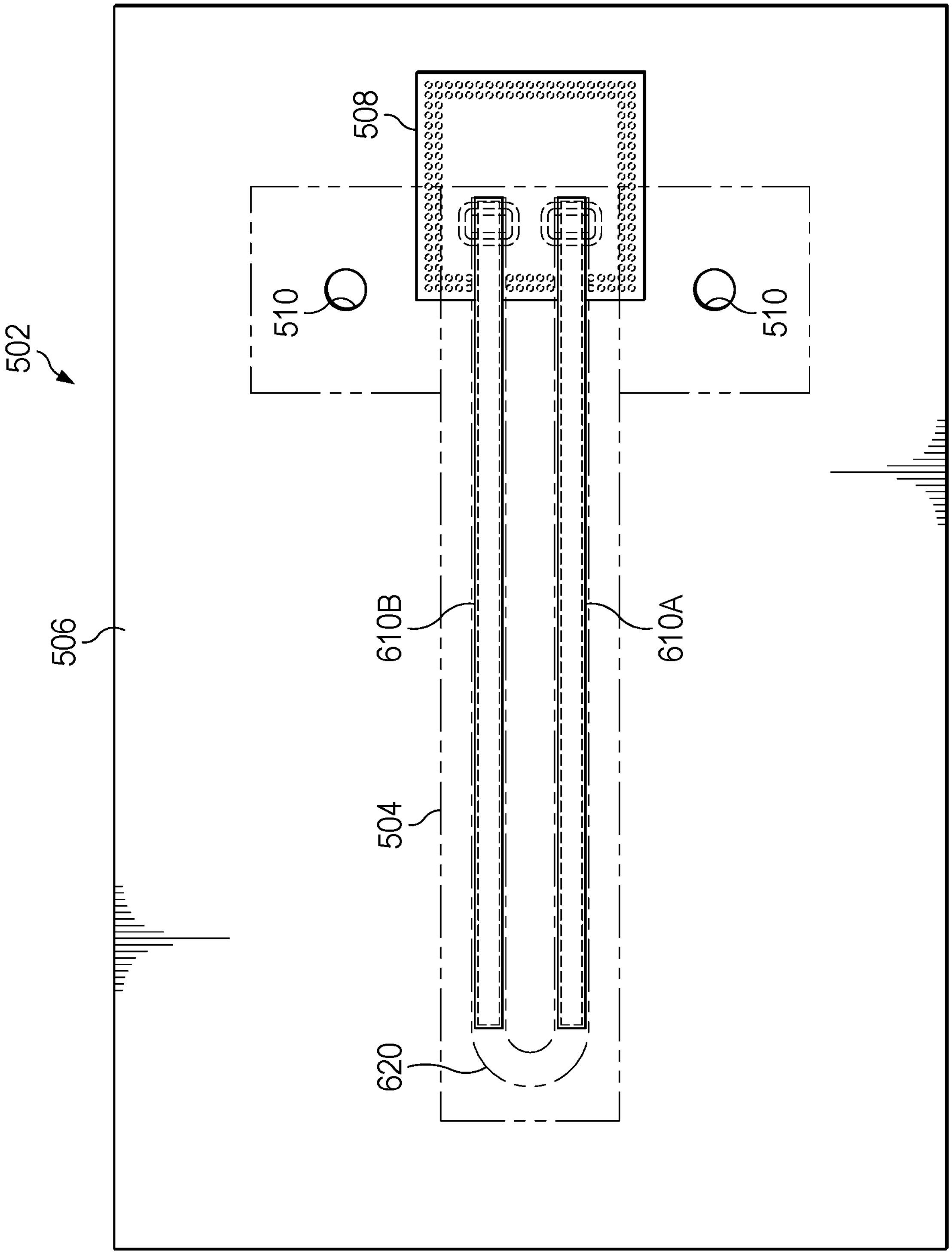
FIG. 10 is a schematic illustrating a top-down view of the detector system of FIG. 5.

FIG. 10 is a top-down view showing certain features 504, 506, 508, 510, 610A, 610B, 620 of detector system 502, albeit, in this top-down view, waveguides 650A, 650B are at least partially obscured by respective ends of containers 610A, 610B.

Figure 11:
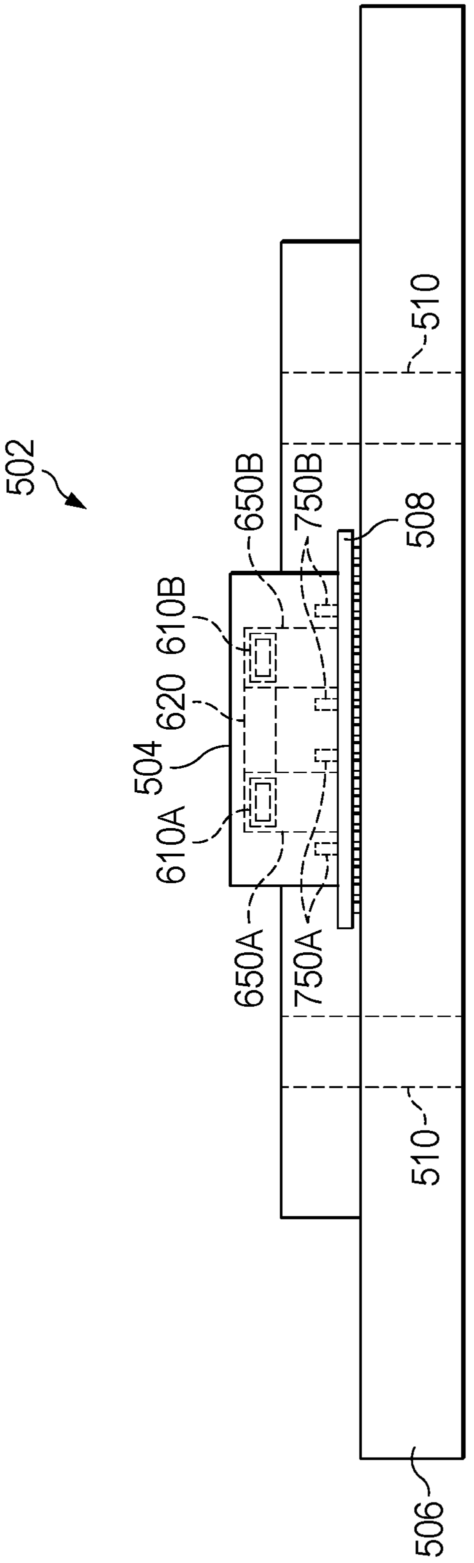
FIG. 11 is a schematic illustrating a front view of the detector system of FIG. 5.

FIG. 11 is a front view showing certain features 504, 506, 508, 510, 610A, 610B, 620, 650, of detector system 502. FIG. 11 shows waveguide 650A as having a trench 750A extending around the periphery of waveguide 650A and further shows waveguide 650B as having a trench 750B extending around the periphery of waveguide 650B.

Figure 12:
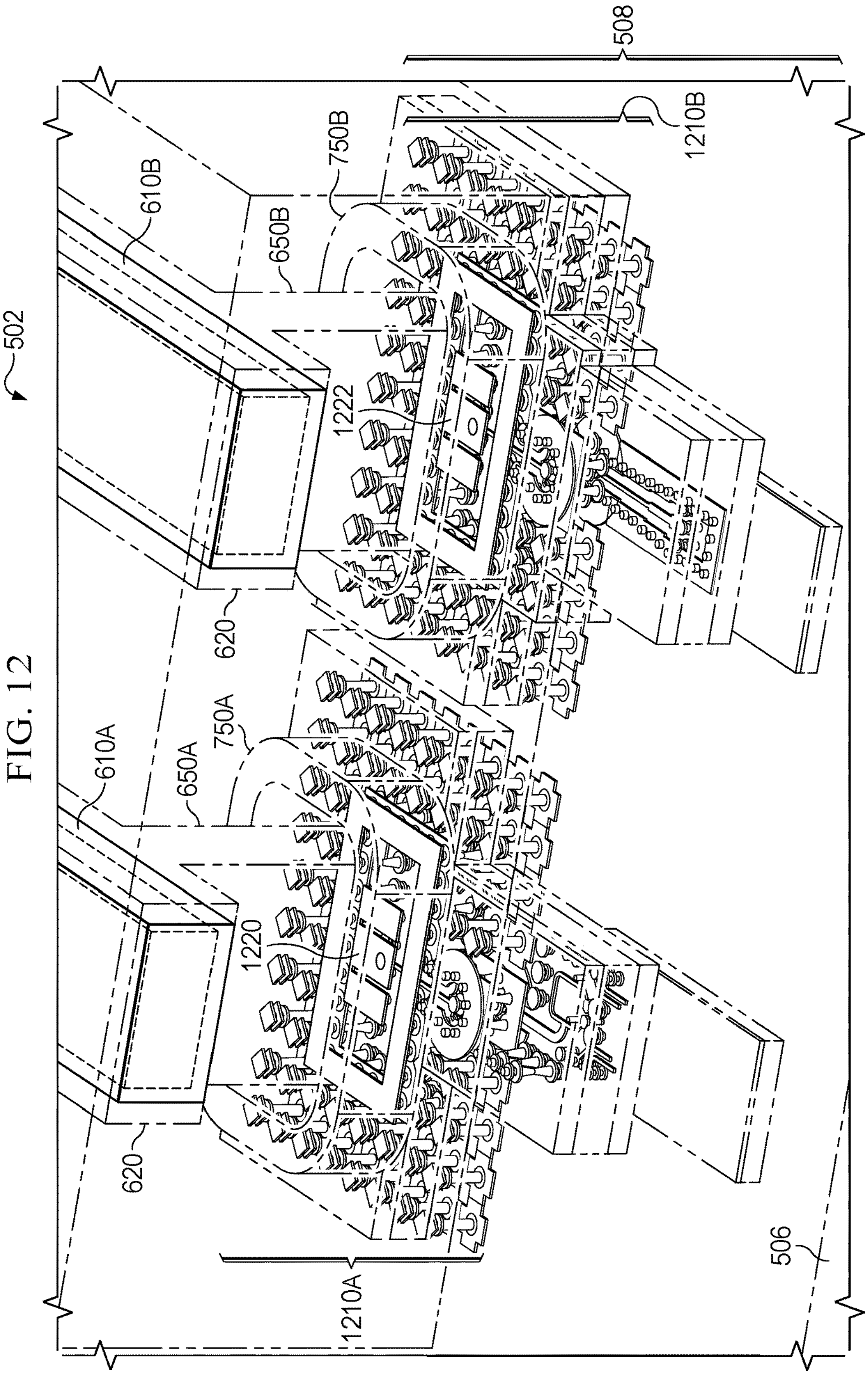
FIGS. 12 and 13 are schematics illustrating perspective and transparent views of portions of the detector system of FIG. 5 including the signal leakage reduction structures of FIG. 8.

FIG. 12 is a zoomed perspective view of a portion of the detector system 502, including enclosure 504, substrate 506, circuitry 508, containers 610A, 610B, cavity 620, waveguides 650A, 650B, and trenches 750A, 750B. View 1200 also shows EBGs 1210A, 1210B positioned around the periphery of TX and RX antennas 1220, 1222, respectively, which can be part of the package substrate 752 of circuitry 508. TX and RX antennas 1220, 1222 may be similar in material respect to TX and RX antennas 104, 106, respectively, of FIG. 1. The arrangement shown in FIG. 12 can provide a near field coupling between TX antenna 1220 and waveguide 650A and between RX antenna 1222 and waveguide 650B.

Figure 15:
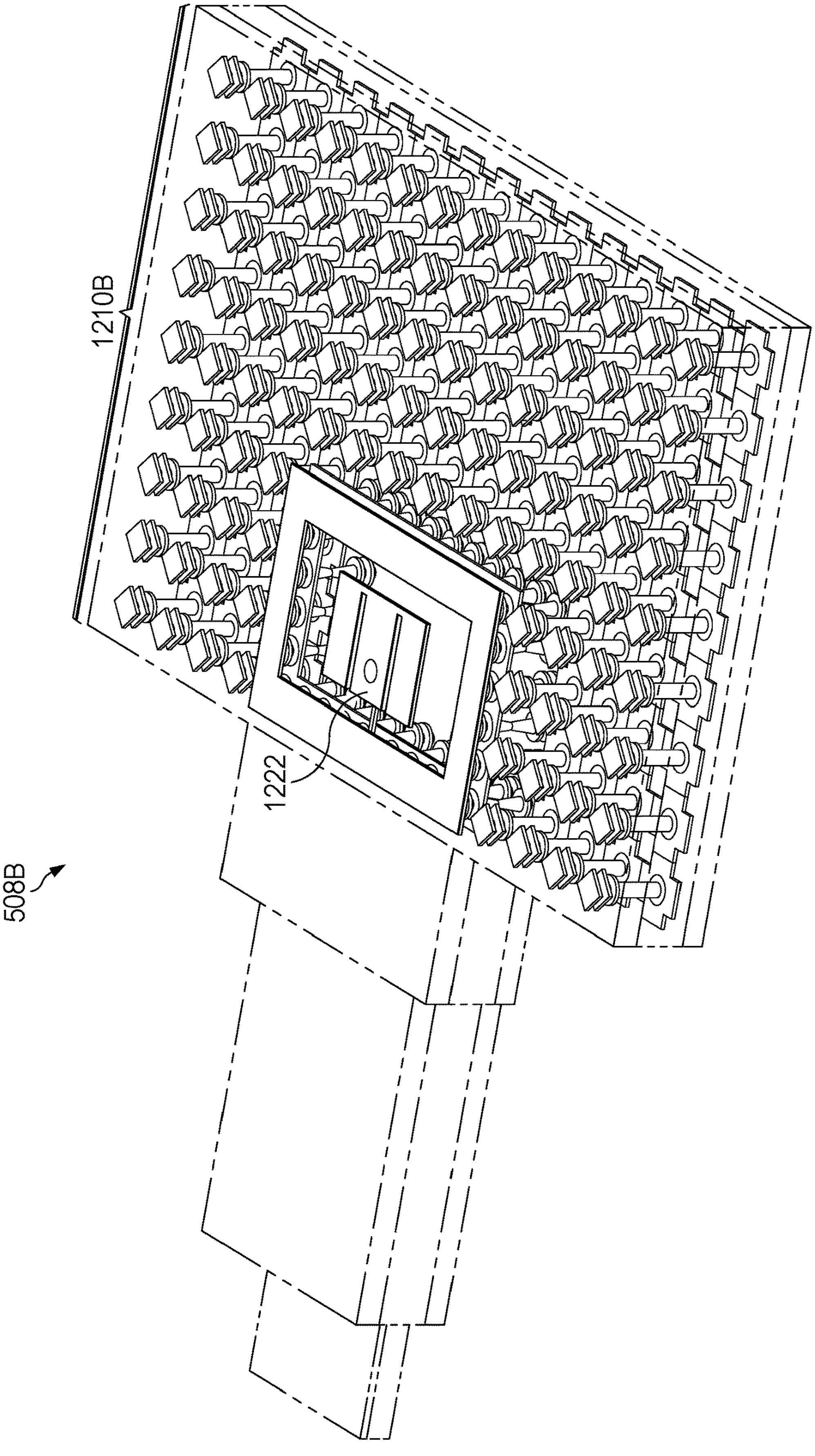
FIG. 15 is a schematic illustrating a perspective view of a circuit board including, which can be included within the detector system of FIG. 5.

As shown more clearly in FIG. 15, each EBG 1210A, 1210B may include an array of metal vias extending fully through a substrate portion of circuitry 508 (indicated by the thickness dimension 812 of FIG. 8). The metal vias of each EBG 1210A, 1210B may be formed, for example, using laser induced deep etching (LIDE). Each via, once formed, may be at least partially filled, or otherwise have its interior coated with one or more layers of material. The material may be selected, for example, to improve an electromagnetic field (EMF) rejection achieved by EBGs 1210A, 1210B. Each metal via may be cylindrical in shape and may have approximately a 50 micrometer diameter, but any suitable shape and width may be used. Each metal via in EBGs 1210A, 1210B can be electrically connected to a ground terminal and each metal via may be capacitively coupled to at least one other adjacent metal via. Each metal via may be configured as a resonator having a resonant frequency based on a frequency of an EM signal in the substrate.

In some examples, the metal vias of EBGs 1210A, 1210B may each have a thickness corresponding to the substrate thickness dimension 812 of FIG. 8, in which each metal via has a length corresponding to an odd multiple of a wavelength of an EM signal in the substrate.

In some examples, the metal vias of EBGs 1210A, 1210B are spaced apart from each other at a distance of $\lambda'/4$, where $\lambda'$ is the wavelength an EM signal as transmitted within a solid dielectric material of substrate 506 in the volume between the metal vias of EBGs 1210A, 1210B. In certain examples, spacing apart the metal vias at a distance of N/4 may increase the destructive interference of EMF propagation across the volume defined by EBGs 1210A, 1210B. In some examples, the metal vias of EBGs 1210A, 1210B are spaced apart from each other at a distance of λ/4, where λ represents the wavelength of an EM signal as transmitted through air (e.g., across an air gap between enclosure 504 and circuitry 508 on substrate 506). Such alternative spacing (according to λ/4) may likewise increase the destructive interference of EMF propagation across the volume defined by EBGs 1210A, 1210B.

As explained above, the metal vias of EBGs 1210A, 1210B may be collectively configured to create a high impedance path that reduces lateral cross-talk transmissions of an EMF between antennas 1220, 1222 (e.g., parallel to the x-axis and along substrate 506) by, for example, introducing destructive interference. Such cross-talk transmissions may reduce the power of an EM signal transmitted internally to gas cell enclosure 504 (e.g., internally within waveguides 650A, 650, cavity 620, and containers 610A, 610B).

Figure 13:
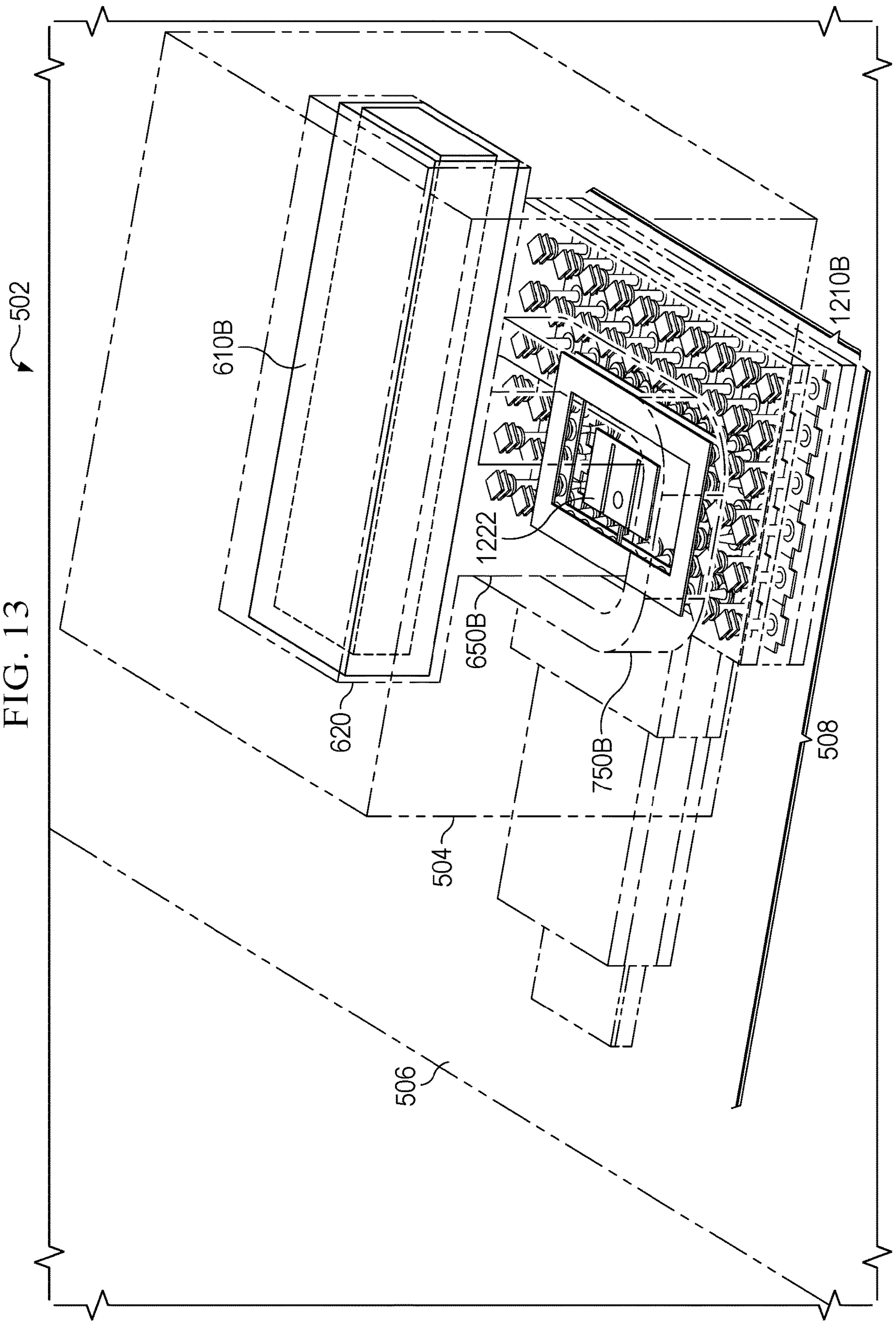

FIG. 13 is a zoomed perspective view of a portion of the detector system 502, in which only a portion of enclosure 504 is shown, together with corresponding portions of substrate 506, circuitry 508, container 610B, cavity 620, waveguide 650B, and trench 750B. The illustrated portion of circuitry 508 includes EBG 1210B positioned around the periphery of RX antenna 1222. In this example, trench 750B has a rectangular annular shape with rounded corners and trench 750B forms a continuous void extending to an edge of enclosure 504 around a periphery of waveguide 650B. Using rounded corners, as opposed to square corners, for example, may result in trenches 750A, 750B having more uniform width dimensions along its entire length, including any corners thereof. A trench 750A, 750B having more uniform dimensions along its entire length may result in a trench having a more uniform effect on an EM signal along the entire length of the trench 750A, 750B. However, trenches 750A, 750B can have any suitable shape that provides certain constructive and destructive interference properties described herein. Although not shown in FIG. 13, trench 750A can be arranged substantially similar to trench 750B with respect to waveguide 650A.

Figure 14:
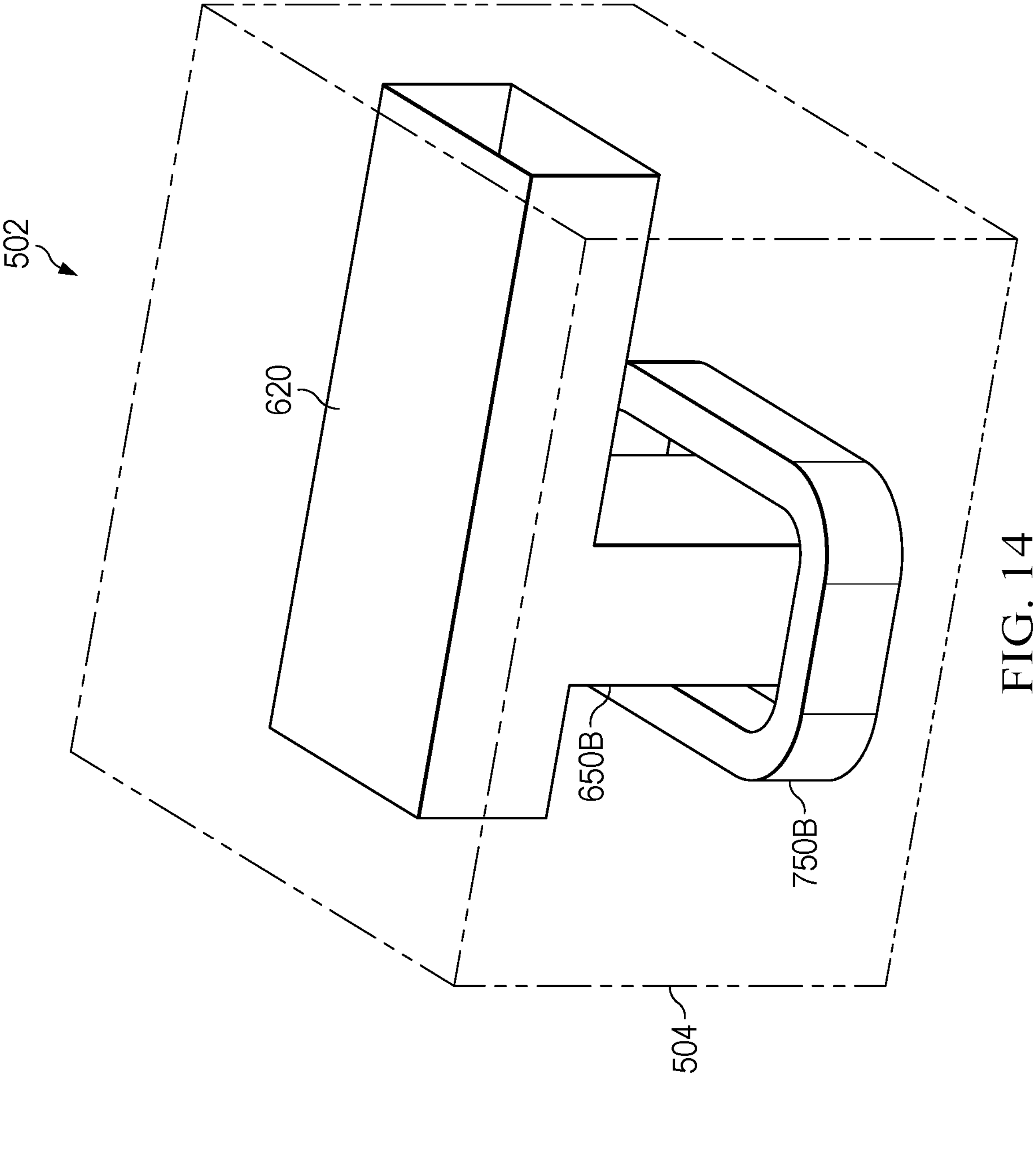
FIG. 14 is a schematic illustrating a perspective and transparent view of a gas cell enclosure portion including the signal leakage reduction structures of FIG. 8.

FIG. 14 is a zoomed perspective view of a portion of the enclosure 504 alone, which can be used for detector system 502. FIG. 14 shows cavity 620 without container 610B enclosed therein. The absence of container 610B and all other features of detector system 502, apart from the illustrated portion of enclosure 504, more clearly shows an example arrangement of trench 750B relative to waveguide 650B and the opening at an edge of enclosure 540 defined by trench 750B.

FIG. 15 is zoomed perspective view of a portion of circuitry 508, including an EBG 1210B that can be arranged around a periphery of RX antenna 1222. As shown in FIG. 12, a similar EBG 1210A can be arranged around a periphery of TX antenna 1220. FIG. 15 also more clearly shows RX antenna 1222, described further herein with reference to FIG. 13.

Figure 16:
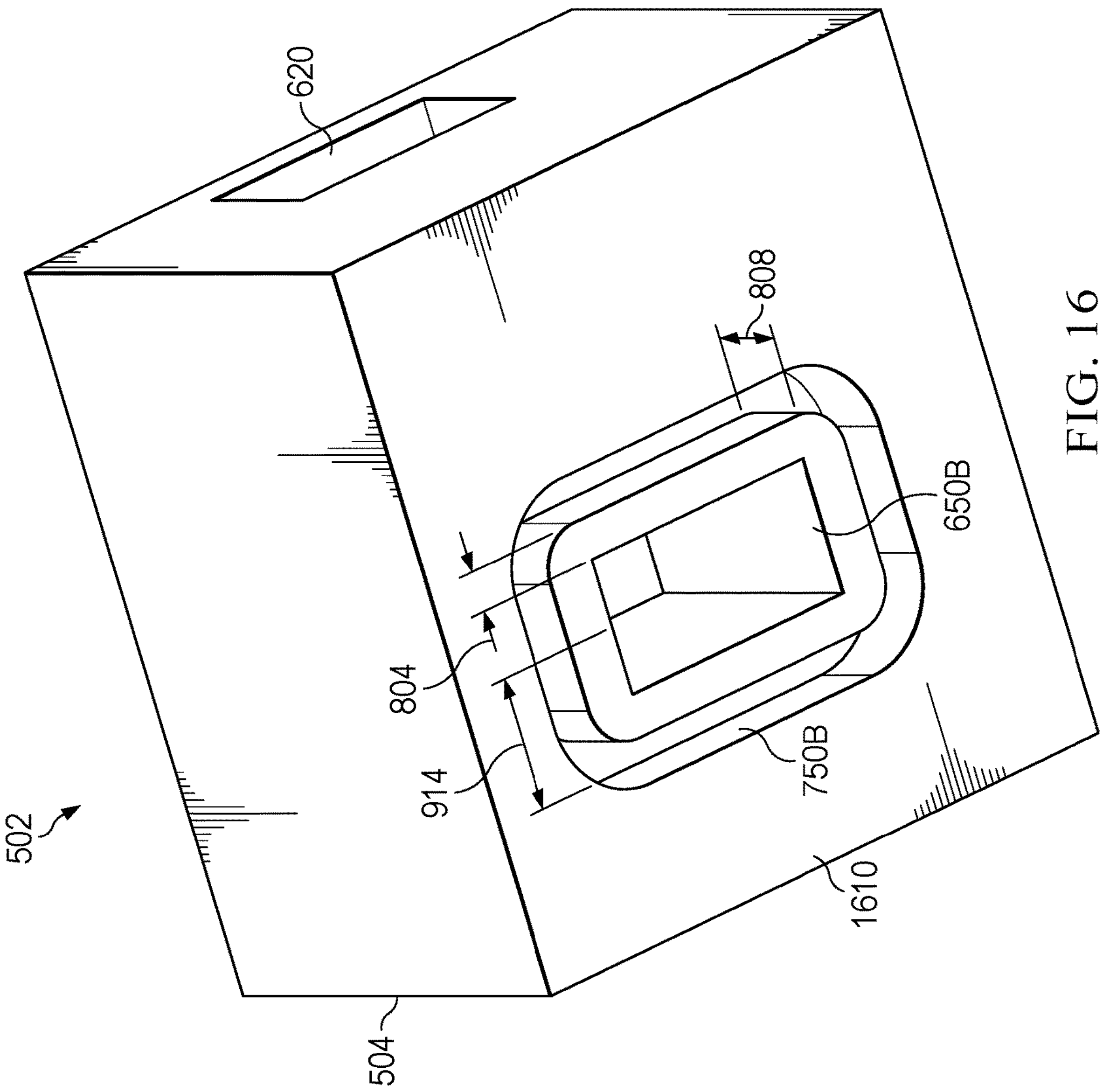
FIG. 16 is as schematic illustrating a perspective view of a gas cell enclosure portion including the signal leakage reduction structures of FIG. 8.

FIG. 16 is a perspective view of a portion of enclosure 504, which is rotated (e.g., relative to view 1400) to show an exterior surface 1610 of enclosure 504 that includes openings extending therethrough corresponding to waveguide 650B and trench 750B. Another opening corresponding to cavity 620 is also shown.

In this example, trench 750B as a rectangular annular shape, with rounded corners, disposed around a periphery of waveguide 650. While FIG. 15 shows trench 750B as having a continuous rectangular annular shape, in some examples, a plurality of unconnected trenches or stubs may be arranged, collectively, around a periphery of waveguide 650B; and similar unconnected trenches or stubs may be likewise arranged around a periphery of waveguide 650A.

As described further herein with reference to FIGS. 8 and 9, in some examples, trench 750B may have a depth dimension 808 that is an odd multiple of λ/4; and the distance between center axis 912 of waveguide 650B and center axis 914 of trench (shown is dimension 910) may likewise be an odd multiple of λ/4. In some examples, the distance between center axis 912 of waveguide 650B and center axis 914 of trench 750B (shown is dimension 910) may be based on an odd multiple of the wavelength λ of a given EM signal (as transmitted through air) and the depth dimension 808 of the trench 750B, in which the EM signal is to be transmitted across an air gap between surface 1610 and an opposing surface of circuitry 508 on substrate 506.

Figure 17:
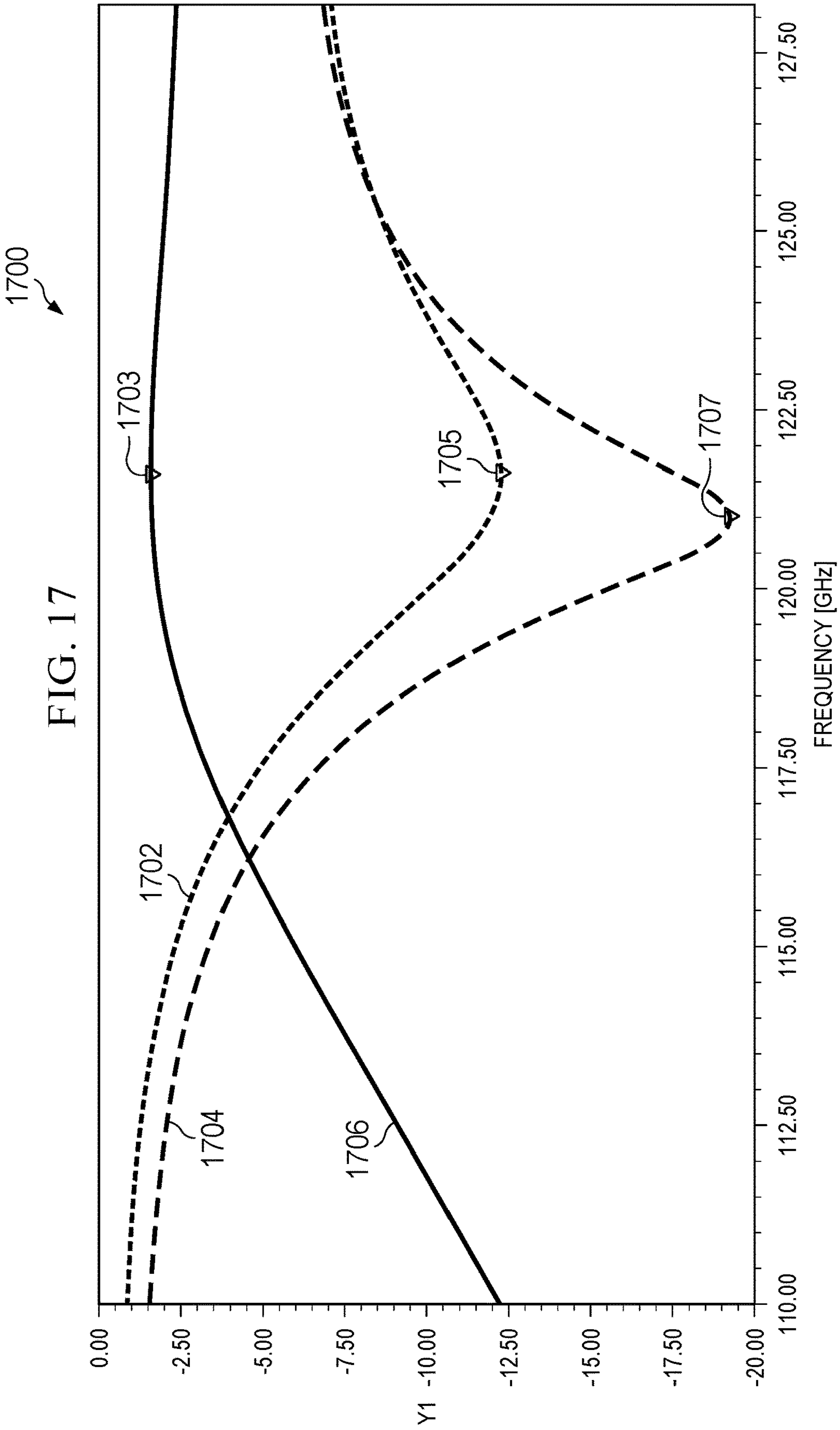
FIG. 17, FIG. 18, FIG. 19, and FIG. 20 are graphs illustrating example variations of s-parameters at the interface between a waveguide and an antenna of a quantum frequency detector system.

FIG. 17 is a graph 1700 showing the s-parameters of the interface between the waveguide and the antenna resulting from substantially no gap at the interface between antennas 1220, 1222 and the respective openings of waveguides 650A, 650B. Data plot 1702 indicates that most of the energy (i.e., −1 dB) at a frequency of interest (e.g., indicated by point 1703 at approximately 121.6 GHz) is successfully transferred from TX antenna 1220 through waveguide 650A to containers 610A, 610B within gas cell enclosure 504. Data plots 1704 and 1706 indicate that a relatively small percentage of energy is reflected under the same no-gap condition, where plot 1706 indicates reflections at TX antenna 1220 and plot 1704 indicates reflections at RX antenna 1222. For plot 1704, the peak reflection at point 1705 is approximately −12 dB; and for plot 1706 the peak reflection at point 1707 is approximately −19 dB.

Figure 18:
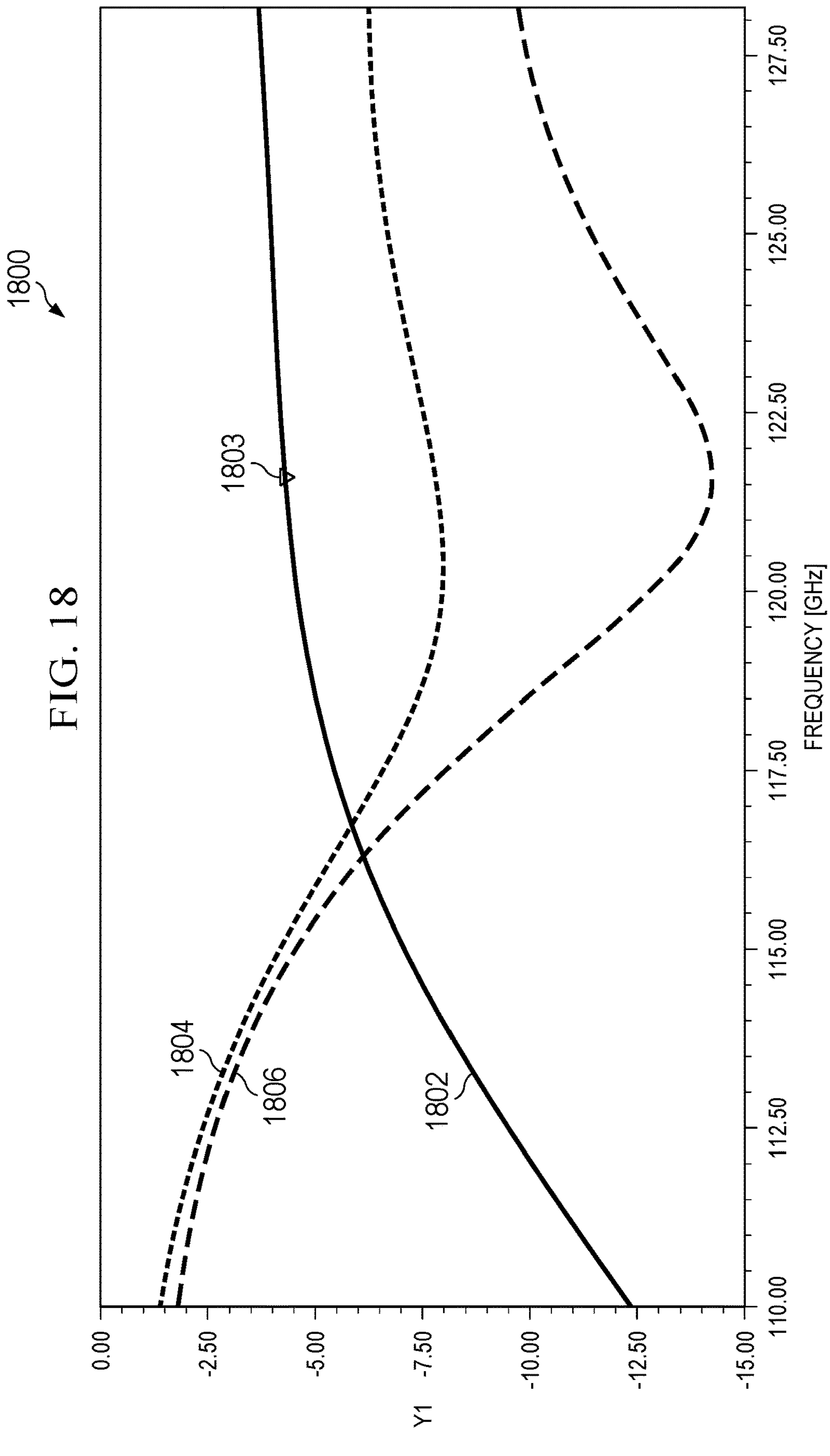

FIG. 18 is a graph 1800 showing the s-parameters of the interface resulting from a 100 μm gap, and no trenches 750A, 750B or EBG features 1210A, 1210B, at the interface between the antennas 1220, 1222 and respective openings of waveguides 650A, 650B respectively. Data plot 1802 indicates the portion of transferred power is −4.2 dB at a frequency of interest (e.g., indicated by point 1803 at approximately 121.6 GHz). The power transferred at a frequency of interest at point 1803 is less than the power transferred at the same frequency of interest at point 1703 of data plot 1702. This difference in transferred power can be attributed, at least in part, to the 100 μm air gap and the lack of trenches 750A, 750B at the air gap interface between antennas 1220, 1222 and the openings in enclosure 504 corresponding to waveguides 650A, 650B. Data plots 1804 and 1806 indicate that a larger percentage of energy is reflected under 100 μm air gap, relative to data plots 1704, 1706, where plot 1806 indicates reflections at TX 1220 and plot 1804 indicates reflections at RX antenna 1222.

Figure 19:
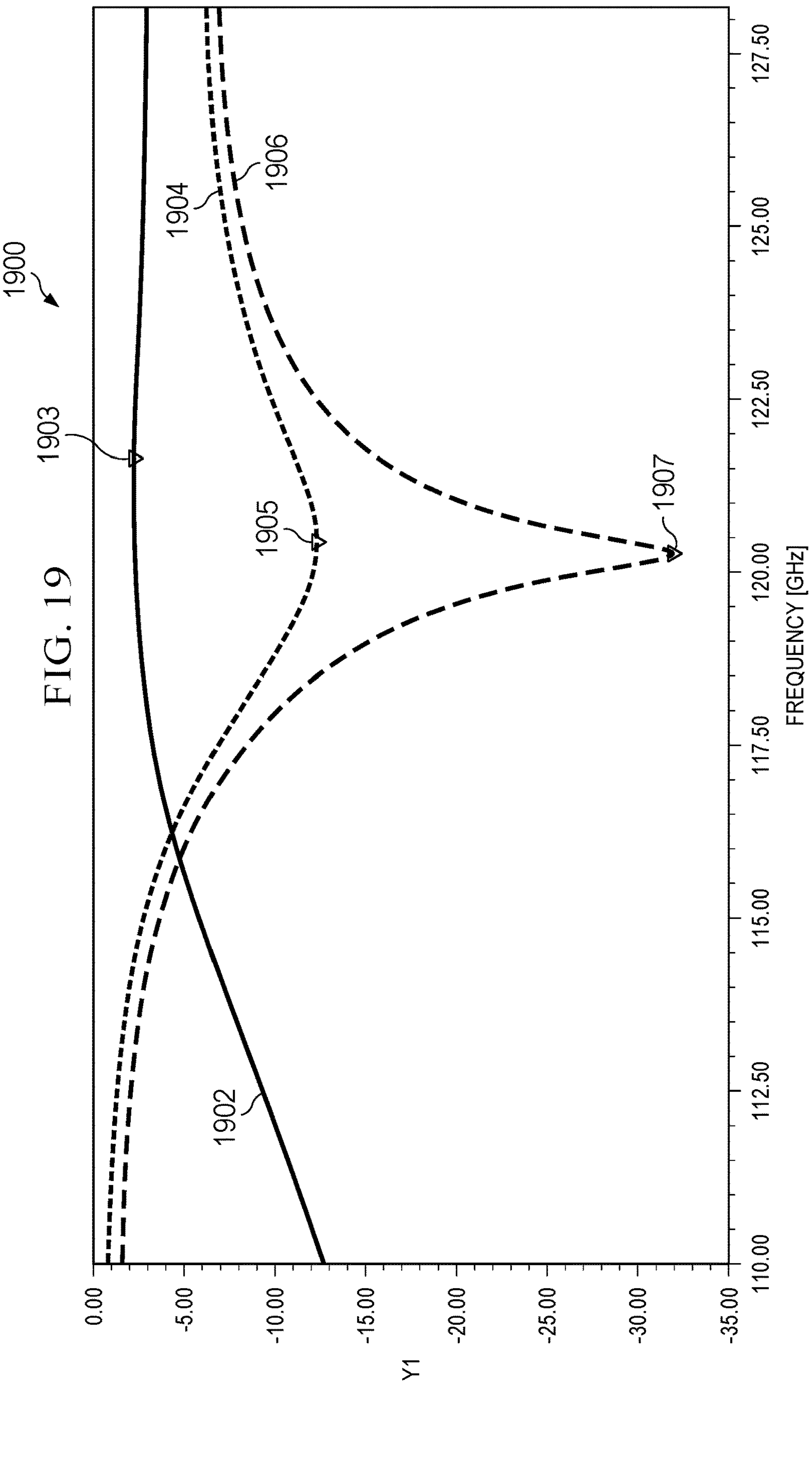

FIG. 19 is a graph 1900 showing the s-parameters of the interface resulting from the combined use of trenches 750A, 750B and EBGs 1210A, 1210B, in which those features collectively operate to at least partially counter the effects of a 100 μm air gap at the interface between antennas 1220, 1222 and the respective openings of waveguides 650A, 650B. In this example, the data shown in graph 1900 is representative of an enclosure 504 including trenches 750A, 750B that each have a depth (dimension 808 of FIG. 8) of approximately 610 μm, a trench width (dimension 806 of FIG. 8) of approximately 300 μm, and a wall thickness (dimension 804 of FIG. 8) of approximately 300 μm.

Data plot 1902 indicates most of the energy (i.e., −2.0 dB) at a frequency of interest (e.g., indicated by point 1803 at approximately 121.6 GHz) is successfully transferred from TX antenna 1220 through waveguide 650A to containers 610A, 610B within gas cell enclosure 504. Data plots 1804 and 1806 indicate that a relatively small percentage of energy is reflected under the same conditions of a 100 um gap and the presence of trenches 750A, 750B, where plot 1906 indicates reflections at TX antenna 1220 and plot 1904 indicates reflections at RX antenna 1222. For plot 1904, the portion of energy reflected back to the gas cell at point 1905 is approximately −12 dB; and for plot 1906 the portion of energy that is reflected back to the TX antenna 1220 at point 1907 is approximately −32 dB. Points 1905, 1907 show a decrease in EM signal reflections relative to corresponding points 1705, 1707 of FIG. 17. Data plot 1902 demonstrates that the use of trenches 750A, 750B in combination with EBGs 1210A, 1210B can result in an increase in the portion of power successfully transferred by via a TX antenna 1220 through waveguide 650A to containers 610A, 610B, including by reducing certain reflections that can otherwise attenuate that transferred power.

Figure 20:
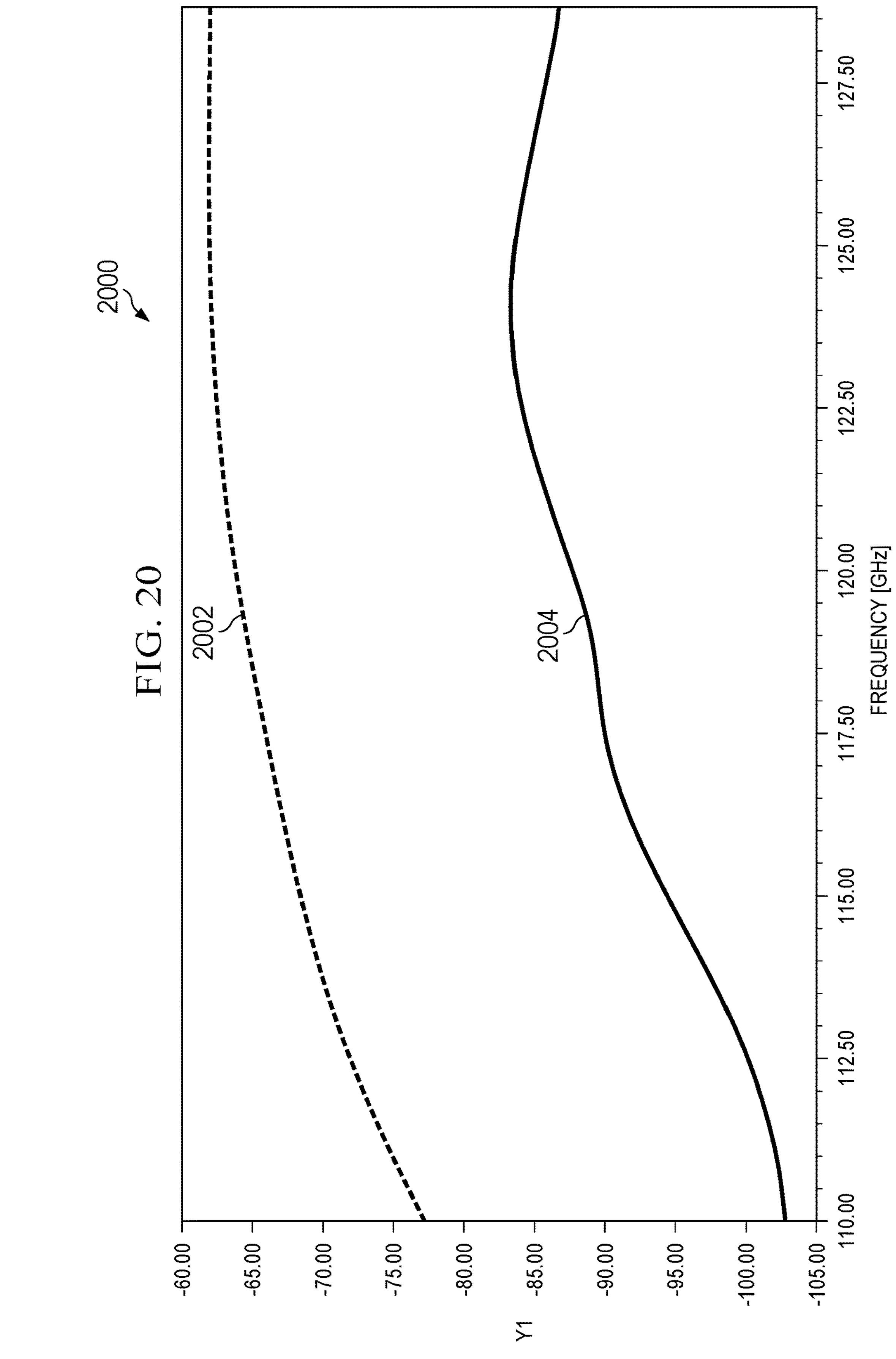

FIG. 20 is a graph 2000 of s-parameters showing a comparison of the cross-talk (plot 2002) between antennas 1220, 1222 resulting from an example detector system 502 having both trenches 750A, 750B and EGBs 1210A, 1210B versus the cross-talk (plot 2004) between TX and RX antennas of an alternative detector that does not have trenches or electromagnetic band gap structures but is otherwise identical. In this example, the data shown in plot 2002 is representative of an enclosure 504 including trenches similar in material respect to trenches 750A,750B, in which each trench has a depth (dimension 808 of FIG. 8) of approximately 610 μm, a trench width (dimension 806 of FIG. 8) of approximately 300 μm, and a wall thickness (dimension 804 of FIG. 8) of approximately 300 μm. EBGs 1210A, 1210B are examples that can have the effect represented in plot 2002. The comparison shows approximately a 30 dB improvement in transmitted power at approximately 121.6 GHz for a detector system 502 that includes trenches 750A, 750B and EBGs 1210A, 1210B, relative to a detector that lacks such features but is otherwise identical.

In some examples, a second trench may be included around a periphery of a first trench. For example, trenches 750A, 750B may each have a rectangular annual trench, with rounded corners, disposed around the periphery thereof. In addition, in some examples, a third trench may be included around a periphery of the second trench.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. To aid the Patent Office, and any readers of any patent issued on this application, in interpreting the claims appended hereto, applicant notes that there is no intention that any of the appended claims invoke 35 U.S.C. § 112(f) as it exists on the date of filing hereof unless the words "means for" or "step for" are explicitly used in the claim language.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples may be included in an integrated circuit and other elements may be external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are:

(i) incorporated in/over a semiconductor substrate; (ii) incorporated in a single semiconductor package; (iii) incorporated into the same module; and/or (iv) incorporated in/on the same printed circuit board.

In this description, unless otherwise stated, "about," "approximately" or "substantially" preceding a parameter means being within +/−10 percent of that parameter or, if the parameter is zero, a reasonable range of values around zero.

In the foregoing descriptions, for purposes of explanation, numerous specific details are set forth to provide a thorough understanding of one or more examples. However, this disclosure may be practiced without some or all these specific details, as will be evident to one having ordinary skill in the art. In other instances, well-known process steps or structures have not been described in detail in order not to unnecessarily obscure this disclosure. In addition, while the disclosure is described in conjunction with example examples, this description is not intended to limit the disclosure to the described examples. To the contrary, the description is intended to cover alternatives, modifications, and equivalents as may be included within the spirit and scope of the disclosure as defined by the appended claims.

What is claimed is:

1. An apparatus comprising:
a gas cell enclosure including:
a gas cell cavity;
an opening extending between the gas cell cavity and an external surface of the gas cell enclosure, a first internal surface of the opening being coated with a first electromagnetic (EM) reflective coating; and
a trench on a periphery of the opening and extending from the external surface towards the gas cell cavity, a second internal surface of the trench being coated with a second EM reflective coating.

2. The apparatus of claim 1, further comprising:
a substrate facing the external surface; and
an antenna on the substrate facing the opening, the antenna configured to transmit a signal,
wherein a depth of the trench from the opening is based on an odd multiple of a wavelength of the signal in the trench.

3. The apparatus of claim 2, wherein the external surface is separated from the substrate by a gap;
wherein the wavelength is a first wavelength; and
wherein a distance between the trench and the opening is based on an odd multiple of a second wavelength of the signal in the gap, and the depth of the trench.

4. The apparatus of claim 2, wherein the wavelength is a first wavelength, and a thickness of the substrate is based on an odd multiple of a second wavelength of the signal in the substrate.

5. The apparatus of claim 2, wherein the substrate includes an array of metal vias configured as resonators having a resonant frequency based on a frequency of the signal.

6. The apparatus of claim 5, wherein the array of metal vias are part of an electromagnetic band gap structure.

7. The apparatus of claim 1, wherein the trench surrounds the opening.

8. The apparatus of claim 7, wherein the trench has rounded corners or a circular footprint.

9. The apparatus of claim 1, further comprising a gas cell in the gas cell cavity, the gas cell containing a dipolar gas.

10. The apparatus of claim 9, wherein the opening is a first opening proximate a first end of the gas cell, and the trench is a first trench; and
wherein the gas cell enclosure includes:
a second opening proximate a second end of the gas cell and extending between the gas cell cavity and the external surface of the gas cell enclosure, a third internal surface of the opening being coated with a third electromagnetic (EM) reflective coating; and
a second trench on a periphery of the second opening and extending from the external surface, a fourth internal surface of the second trench being coated with a fourth EM reflective coating.

11. An apparatus comprising:
a substrate;
an antenna on the substrate;
a sealed container enclosing a dipolar gas;
a waveguide communicatively coupled between the antenna and the sealed container, the waveguide being separated from the substrate by a gap; and
a stub separated from the substrate by the gap and extending away from the gap towards the sealed container.

12. The apparatus of claim 11, wherein the waveguide is surrounded by a structure having a trench that extends away from the gap, and the trench includes the stub.

13. The apparatus of claim 12, wherein the trench surrounds the waveguide.

14. The apparatus of claim 13, wherein the trench has rounded corners or a circular footprint.

15. The apparatus of claim 12, further comprising a container enclosure enclosing the sealed container and the waveguide, and the structure is part of the container enclosure.

16. The apparatus of claim 11, wherein the antenna is configured to transmit a signal into the sealed container via the waveguide, and a length of the stub is based on odd multiple of a wavelength of the signal in the stub.

17. The apparatus of claim 16, wherein the wavelength is a first wavelength, and the stub is separated from the waveguide by a distance based on a second wavelength of the signal in the gap and the length of the stub.

18. The apparatus of claim 16, wherein the wavelength is a first wavelength, and a thickness of the substrate is based on an odd multiple of a second wavelength of the signal in the substrate.

19. The apparatus of claim 16, wherein the substrate includes an array of metal vias configured as resonators having a resonant frequency based on a frequency of the signal.

20. The apparatus of claim 19, wherein the array of metal vias are part of an electromagnetic band gap structure.

* * * * *